US011876915B2

United States Patent
Doney et al.

(10) Patent No.: US 11,876,915 B2
(45) Date of Patent: Jan. 16, 2024

(54) METHOD, APPARATUS, AND COMPUTER-READABLE MEDIUM FOR AUTHENTICATION AND AUTHORIZATION OF NETWORKED DATA TRANSACTIONS

(71) Applicant: SECURRENCY, INC., Annapolis, MD (US)

(72) Inventors: George Daniel Doney, Annapolis, MD (US); Ihor Yermakov, Abu Dhabi (AE); Ilya Shkapo, Kharkov (UA); Oleksii Korzhuk, Kharkov (UA)

(73) Assignee: SECURRENCY, INC., Annapolis, MD (US)

( * ) Notice: Subject to any disclaimer, the term of this patent is extended or adjusted under 35 U.S.C. 154(b) by 370 days.

(21) Appl. No.: 17/332,375

(22) Filed: May 27, 2021

(65) Prior Publication Data

US 2021/0377045 A1    Dec. 2, 2021

Related U.S. Application Data

(60) Provisional application No. 63/030,416, filed on May 27, 2020.

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/31* (2013.01); *G06F 21/62* (2013.01); *G06F 21/64* (2013.01);
(Continued)

(58) Field of Classification Search
None
See application file for complete search history.

(56) References Cited

U.S. PATENT DOCUMENTS 10,193,696 B2  1/2019 Struttmann et al.
11,194,837 B2  12/2021 Vo et al.
(Continued)

FOREIGN PATENT DOCUMENTS

WO       2020092900 A2       5/2020
WO   WO-2020092900 A2 *     5/2020   ........... G06F 21/602

OTHER PUBLICATIONS

International Searching Authority, International Search Report and Written Opinion for International Application No. PCT/US21/34556 dated Aug. 31, 2021.

*Primary Examiner* — Andrew J Steinle
(74) *Attorney, Agent, or Firm* — NEO IP

(57) ABSTRACT

A method and apparatus for cryptographically linking separated authentication and authorization processes to support data transaction signing when group or corporate authority structures are required. The apparatus provides a secure, scalable model to represent authority in an entity context while conducting distributed ledger technology transactions. The method supports a range of cryptographic methods for separating the linked authentication and authorization processes including split key encryption, multi-party computation, multi-signature authorization, and execution of decentralized smart contract authorization logic. The method supports multiple models for authorization including organizational structures, consensus models including voting, and workflow processes.

28 Claims, 25 Drawing Sheets

(51) Int. Cl.
*G06F 21/31* (2013.01)
*H04L 9/40* (2022.01)
*G06F 21/64* (2013.01)
*G06F 21/62* (2013.01)
*H04L 9/06* (2006.01)
*H04L 9/00* (2022.01)

(52) U.S. Cl.
CPC ........ *H04L 63/0442* (2013.01); *H04L 63/083* (2013.01); *H04L 63/123* (2013.01); *G06F 2221/2145* (2013.01); *H04L 9/0643* (2013.01); *H04L 9/50* (2022.05); *H04L 2209/56* (2013.01)

(56) References Cited

U.S. PATENT DOCUMENTS

| | | |
|---|---|---|
| 11,301,460 B2 | 4/2022 | Rich et al. |
| 11,488,147 B2 | 11/2022 | Sheng et al. |
| 11,488,161 B2 | 11/2022 | Soundararajan et al. |
| 11,551,191 B2 | 1/2023 | McNamara et al. |
| 2014/0129457 A1 | 5/2014 | Peeler |
| 2017/0270493 A1* | 9/2017 | Lugli .................... G06Q 20/10 |
| 2019/0080404 A1 | 3/2019 | Molinari et al. |
| 2019/0180311 A1* | 6/2019 | Chan ................. G06Q 30/0239 |
| 2019/0303623 A1* | 10/2019 | Reddy ....................... G06F 8/71 |
| 2020/0089672 A1 | 3/2020 | Velisetti et al. |
| 2020/0349562 A1 | 11/2020 | Madhuram et al. |
| 2021/0042735 A1 | 2/2021 | Majidi et al. |
| 2021/0192501 A1 | 6/2021 | McNamara et al. |
| 2022/0006705 A1 | 1/2022 | Padmanabhan |
| 2022/0270080 A1 | 8/2022 | Yantis et al. |
| 2022/0271915 A1 | 8/2022 | Turner et al. |

* cited by examiner

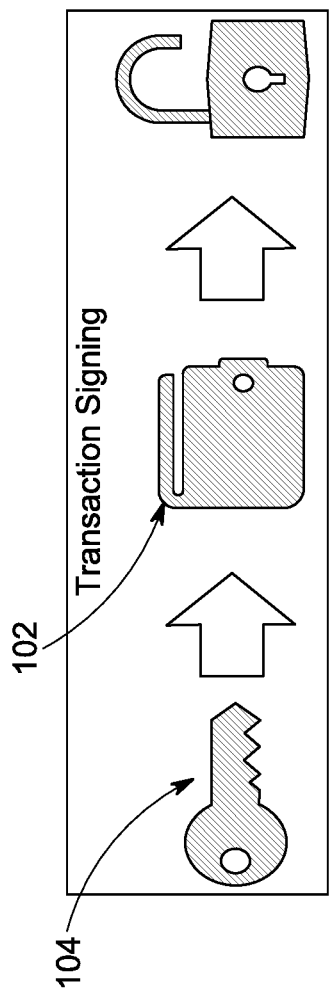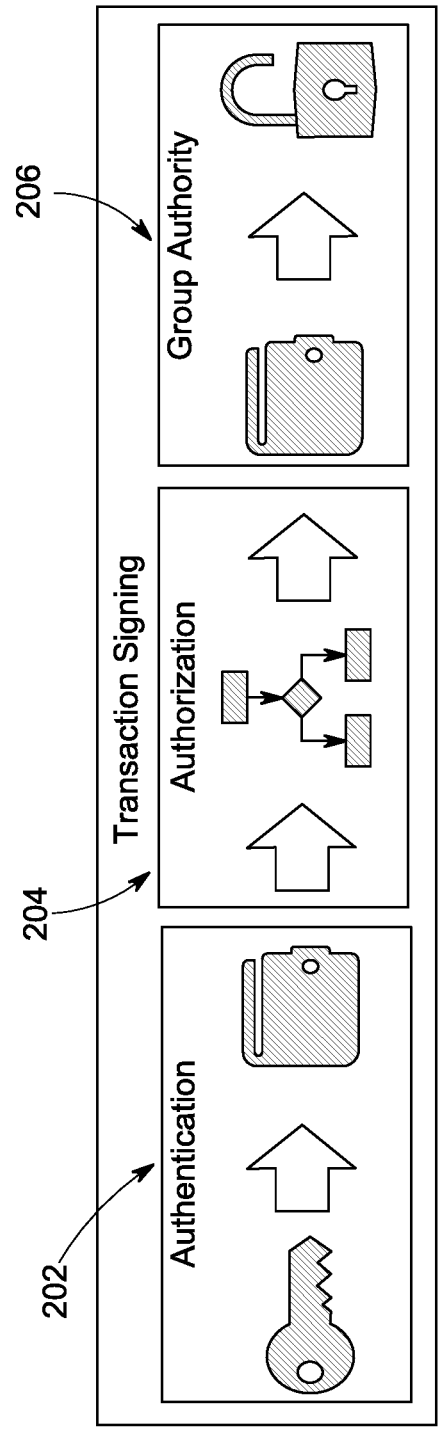

METHOD, APPARATUS, AND COMPUTER-READABLE MEDIUM FOR AUTHENTICATION AND AUTHORIZATION OF NETWORKED DATA TRANSACTIONS

RELATED APPLICATION DATA

This application claims priority to U.S. Provisional Application No. 63/030,416 filed on May 27, 2020, the entire disclosure of which is incorporated herein by reference.

FIELD OF THE INVENTION

The invention relates to cryptographic methods for cryptographically linking separated authentication and authorization processes for data transactions on computing networks.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Distributed Ledger Technologies (DLTs) (also referred to herein as "decentralized networks), such as blockchain networks, are designed to be trustless and pseudonymous. Public/private key combinations are used to demonstrate the authority to operate a network address, known as a "wallet", and the data/value it contains. This allows execution authority to be decentralized, does not require verification of the party executing the transaction, and does not require additional intermediation. Decentralized execution authority is one of the most powerful and compelling features of DLTs. The most recognizable and common demonstration of authority on DLT networks is when an individual signs a transaction with a private key to send value (e.g., tokens) from their wallet to a wallet controlled by another party. This contrasts with traditional banking ledger technologies (relational database technologies or newer NoSQL systems) which tightly couple the intermediary business logic with the mechanisms for authenticating and authorizing clients. By decoupling authentication processes from business logic (which is often encapsulated in "smart contracts"), DLTs promise innovative user experiences and financial products.

However, many data transactions are performed under the authority of an entity or authorized through a process rather than an individual. The authority to perform certain functions or take certain actions are delegated by entities to individuals based on the rights and qualifications of the individuals. Sometimes, authority is delegated to other entities, who in turn, delegate authority to individuals. For example, a law firm, a Broker, or a transfer agent may be delegated authority to act on behalf of an entity. The respective Partner, Registered Principal or President may be authorized to act on behalf of such entities for specific purposes. Under most state corporation laws, and as further specified in a company's articles of incorporation and bylaws, the individual officers of a company are automatically delegated authority to perform certain types of functions. While the functions are performed under the authority of the entity, it is frequently natural persons and Non-Person Entities (NPE), such as machine processes, that perform the actions pursuant to authority delegated by the entity. This authority only resides in a context (within the scope of the entity) and is often temporary (e.g., as long as the individual is assigned to the entity). Enabling individuals to express authority delegated by an entity to perform a proposed task (e.g., sign a transaction), requires a separation of authentication (i.e., proper identification of an individual) and authorization (i.e., verification of the individual's right in the group context).

For example, the comptroller of an entity may have the authority, based on affiliation with a company's finance department, to originate (but usually not release) payments to external entities. Authority to perform this action might not extend outside the company (e.g., the comptroller might not have authority to originate payments for other companies), exists only for the time that the individual holds the position, and is often part of a multi-step process which may require approval or other tasks associated with approval of the proposed transaction.

In a group context, multiple parties may have the authority to make data transactions on behalf of the entity, such as operate the value owned by the entity. In a conventional DLT environment, authorizing multiple individuals to sign transactions requires providing access to the private key by each such individual and thus creates a breakdown in accountability (it is impossible to identify who actually performed the action), increases the probability of a security breach due to theft or malice, and provides no mechanism to remove the individual's ability to exercise the authority even if their affiliation is removed from the group. In short, once the private key is known, it has been compromised.

Unfortunately, reliance on public/private key transaction signing, such as in DLT environments, conflates two important concepts present in most corporate actions: authentication and authorization. Signing a transaction using a public/private key is used to both authenticate (ensure the actor is the owner of the public address) and authorize (demonstrate the right to perform a function) the signer. Since these concepts are conflated, many corporate structures and nuances essential to corporate functions cannot be executed over a decentralized network without sacrificing authentication (by sharing the key) or authorization (rights and roles of participants can't be distinguished).

Role Based Access Control (RBAC) like Active Directory or LDAP, and Access Control Lists (ACL) are conventional techniques for granting authority in an enterprise context. However, these authorization techniques depend on centrally administered identity management, role definitions, and infrastructure. This centralization results in challenging integrations with external enterprises and results in fragmentation of the financial services marketplace. Further, integrating these centralized mechanisms with a decentralized network presents significant technical challenges.

Other known mechanisms for providing authority in a multiparty (group/entity) context includes multi-signature wallets and Multi Party Computation (MPC) methods for expressions of authority. For both of these techniques, group authority structure is reflected in a flat structure enabling any member or combination of members of a group sign a transaction thereby expressing the authority of the group. While these models can be used in conjunction with the disclosed implementations, by themselves they lack flexibility in the management of the authority structures and provide no means to link complex corporate authority structures that may involve nested groups, sequential processes, or temporary authority to the individual proposing a transaction.

Additionally, these methods do not cryptographically bind third party authentication or authorization techniques with the on-chain expression of authority in the context of a transaction. Disconnected authentication and authorization steps may be used, but the proposed transaction could be changed prior to execution undermining the integrity of the system.

Furthermore, these MPC and multi-sig methods do not present a framework by which the wide range of authorization systems and techniques can be incorporated in the cryptographic signing event or can be considered in the context of a proposed transaction.

In summary, the explicit centralization of conventional authorization processes creates a "walled garden", an artificial boundary based on a technical approach that undermines efficient collaboration with entities outside the enterprise. In a global financial system with many interconnected enterprises, "walled gardens" cause delays in trade settlement and reconciliation, result in massive inefficiency, and complicate compliance—making oversight reactive instead of proactive. Additionally, centralization of authorization undermines one of the principal benefits of distributed ledger systems, decentralized expression of authority thus limiting the potential of the breakthrough technology. Without a method to integrate decentralized authentication to authorization in the transaction signing process, the ease of access and channel for rapid innovation afforded by DLTs are lost.

SUMMARY

The disclosed implementations overcome the limitations noted above by including separate mechanisms for authentication and authorization in the cryptographic signing process within the context of a decentralized network environment. The term "authentication", as used herein, refers to any technique used to validate, directly or indirectly, a signer's identity. Examples of authentication include presenting a public and private key, a username and password, a wallet/secret, biometric techniques for identification, and other known techniques for authentication. The term "authorization", as used herein, refers to any technique used to verify the authority of an authenticated party and/or parties (using roles of an individual within an entity, a group within an entity, business processes or approval chains, LDAP or Active Directory groups, social media groups or friends list, and the like) to make a proposed state change (transaction).

Conventional distributed ledger technologies (DLT) do not separate these distinct business requirements, i.e., authentication and authorization, in cryptographic signing of transactions. However, the disclosed implementations provide a novel computer architecture, data model, processes and algorithms for allowing cryptographically linked authentication processes and authorization processes to be accomplished as distinct steps within a decentralized environment by cryptographically linking each process in the context of a proposed transaction, considering each separately, and requiring each component to successfully approve (or sign) state change.

In disclosed implementations, the actor (i.e., the initiatory of the transaction such as an individual) is authenticated, proposes a transaction which must be authorized using a separate but cryptographically linked process to sign and initiate the transaction. Several implementations of the technique to link authentication and authorization (A&A) cryptographically are disclosed including: linking the A&A processes using an encrypted access token and key fragments required to decrypt the wallet's secret; assigning separate Multi-Party Computation (MPC) or multi-signature (multisig) approval rights to the authentication and authorization service linked by an encrypted access token; or implementing on-chain authorization for the authenticated signer using smart contract based authorization. For the latter, the authentication and authorization process are separated but linked by the signing context for transactions initiated directly within a decentralized environment. Alternatively, the linking can be accomplished by an access token, i.e., an object that specifies, directly or indirectly, the security context of the initiator of a process or thread generated by a trusted entity for network-initiated transactions. One disclosed implementation involves encrypting the transaction signing secret with fragments representing the authentication, authorization, and other (if desired) processes. The disclosed implementations provide for a transaction system having increased security and flexibility.

A first aspect of the invention is a method for executing a data transaction on a decentralized computer network on behalf of an entity wherein an actor's right to conduct the transaction on behalf of the entity is determined by an actor authentication process which is cryptographically linked to, but separate from an entity authorization process, the method comprising: authenticating the actor; in response to authenticating the actor, creating a cryptographically signed data packet (access token) providing an actor ID, optionally an entity ID to represent context, an authenticating service ID to thereby establish a authentication context for the initiator of a transaction; verifying the authentication context to execute business logic including; formulating the proposed data transaction in the context of the entity and including, in certain implementations the access token encrypted; authorizing the transaction using a separate authorization process by validating the authentication context, in certain implementations by inspecting the included access token, and the right of the actor to perform the proposed transaction on behalf of the entity; executing the data transaction on behalf of the entity including signing the data transaction to provide cryptographic assurance of the completion of the authenticating step, the creating step, the verifying step, the defining step and the authorizing step; and recording the signed data transaction on a decentralized ledger of the decentralized computer network.

A second aspect of the invention is a system for executing a data transaction on a decentralized computer network on behalf of an entity wherein an actor's right to conduct the transaction on behalf of the entity is determined is captured in a novel smart contract structure. A smart contract, i.e., executable code stored on a decentralized ledger, representing a entity and the encapsulated organizational structure and processes is linked, via smart contract proxy, to a smart contract wallet, that is, the a contract with the authority to conduct transactions on behalf of an entity, the wallet is activated by the actor by signing a proposed transaction (the signing the equivalent of authentication), and the transaction is authorized by encapsulated authorization processes for the entity, resulting in the execution of the proposed transaction on behalf of the entity.

A third aspect of the invention is a method by which varying transaction signing processes (split key encryption, multi-party computation, multi-signature, etc) can be substituted to affect the cryptographic linking of separated authentication and authorization processes in the context of a proposed transaction. Authentication, transaction formulation, and authorization must occur in a cryptographically linked process to avoid the injection of malicious or mistaken elements undermining the integrity of each element.

A forth aspect of the invention is a method for injecting a wide range of authorization processes which can be used independently or in conjunction including authorizations based on complex business structures, elections and voting, configurable business processes and workflows, and editable policies.

A fifth aspect of the invention is computer readable media having instructions stored thereon which, when executed by a computer processor, cause the computer processor to carry out the method described above.

BRIEF DESCRIPTION OF THE DRAWINGS

FIG. 1 is schematic representation of signing transaction in a conventional DLT system.

FIG. 2a is a schematic representation of separation of authentication and authorization in a decentralized network environment.

FIG. 15c is a data schema diagram providing more detail on data structures for the ElectionRegistry and VotingRegistry of FIG. 15a.

DETAILED DESCRIPTION

Figure 2B:
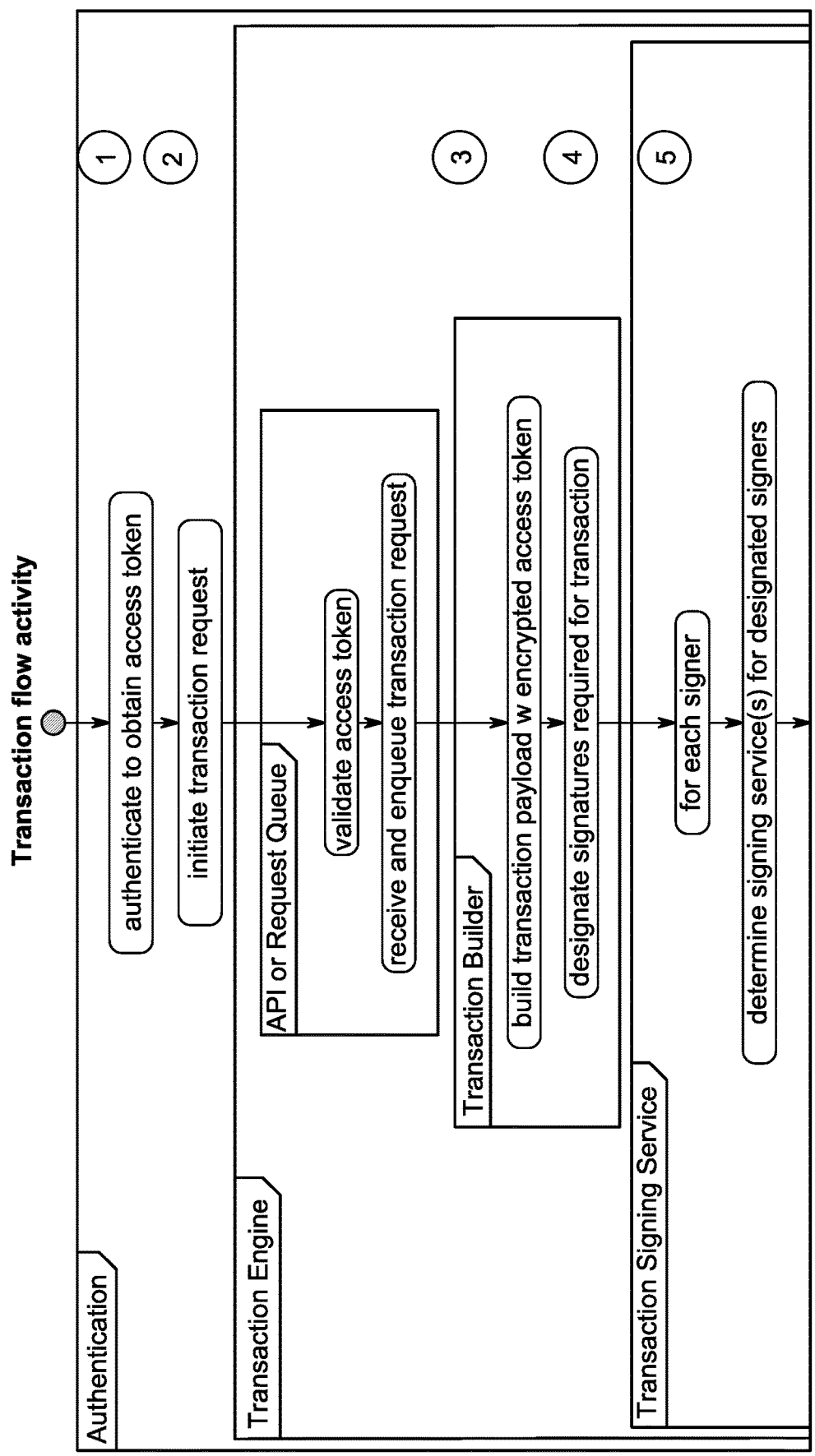
FIG. 2b is a UML illustration of the process of cryptographically linking authentication and authorization in accordance with disclosed implementations.
Figure 2C:
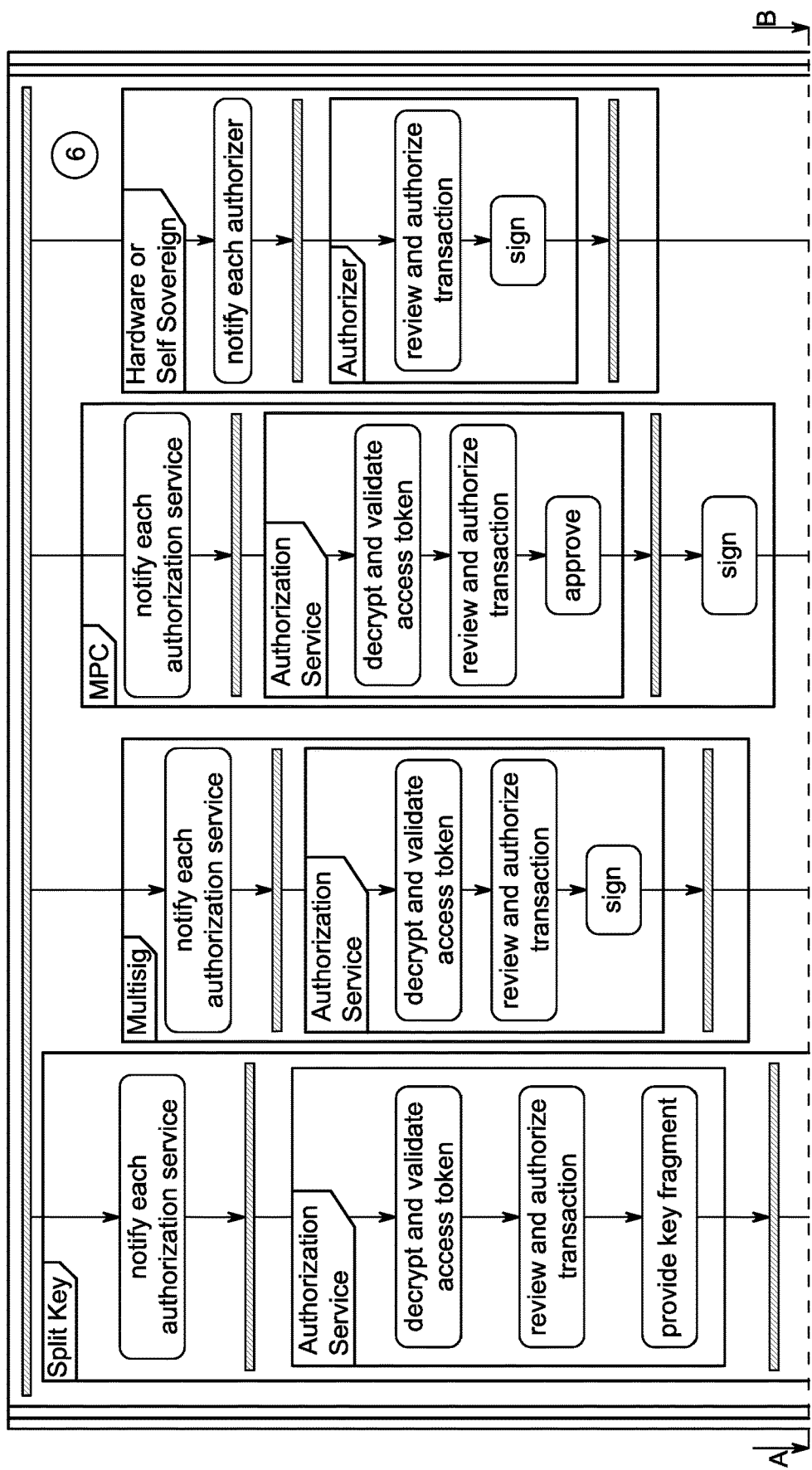
FIG. 2c is a continuation of the UML illustration of the process of cryptographically linking authentication and authorization in accordance with disclosed implementations.
Figure 2D:
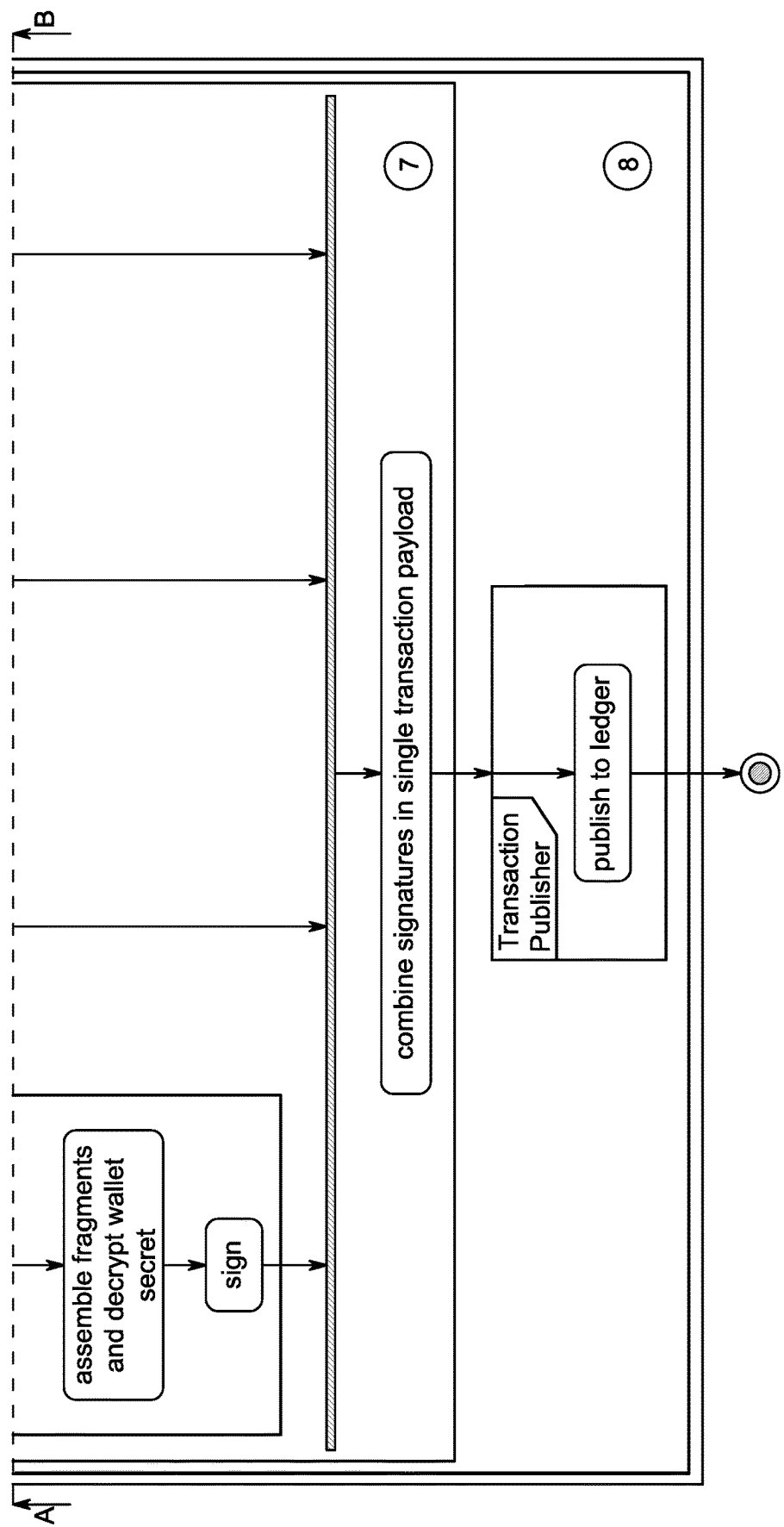
FIG. 2d is a continuation of the UML illustration of the process of cryptographically linking authentication and authorization in accordance with disclosed implementations.

The disclosed implementations provide a cryptographically secure model to extend traditional authorization approaches (RBAC and ACL) to provide seamless integration with decentralized environments such as distributed ledger technologies. Most DLT technologies use asymmetric encryption to sign transactions. This requires the signer to produce the public key (address) and private key (secret) in order to sign the transaction.

FIG. 1 schematically illustrates a conventional DLT data transaction. Each DLT transaction is a state change authorized by an initiator who prepares a transaction 102 and signs it with a public key 104 (often referred to as a "wallet" or "address") that is derived from a private key before sending it to the network for execution. In conventional DLT systems, the signing action both authenticates the initiator as the owner of the address and authorizes the transaction.

In this straightforward model, the authentication and authorization models are synonymous. Therefore, the model doesn't have the means to consider the nature of the transaction, the authority structures under which the transaction may fall, et cetera, when affecting a transaction on the network. So, while transformative in its simplicity, this basic approach undermines important tenets required to manage corporate value thereby minimizing the value of blockchain networks in corporate contexts. FIG. 1 illustrates the basic steps of transaction execution on a network (authentication, authorization, and transaction formulation/signing/publication). It shows these processes as inseparable as they are on basic blockchain transactions. In this disclosure, the basic pattern of this model will be split into cryptographically linked, but separated authentication and authorization steps and varied in a series of implementations as disclosed below.

As noted above, many financial transactions occur in a group context. For example, imagine a company's employee uses corporate resources to purchase a computer. If effected via DLT, the value owned by the company would be stored as a data structure in a corporate wallet to support transactions to further corporate goals. To affect the desired transaction, the employee would need be given the private key for the corporate address (an act that would compromise all value in the wallet) or consult with someone who had access to the private key. The party with access would need to validate the employee's identity, standing, and right to conduct the transaction before initiating the transaction. In any case the individual (or individuals) who have signing authority can't reliability be separated from the authority, even if they leave the company since they have had access to the secret.

Furthermore, the authority structure can be separated from the signing of the transaction itself as authority may depend on the transaction. For example, the employee may have the authority to spend $1,000 on behalf of the company, but not $1,000,000. Any model which establishes authority separated from a signed (and therefore immutable) transaction runs the security risk (cyber or insider) of the transaction being modified after authority has been granted.

Scalable models to represent authority of an individual in a group context in a decentralized system require an implementation to decouples while cryptographically linking authentication of the initiator of a transaction from authorization of a proposed transaction in the context of group authority. This linking while decoupling authentication and transaction authorization has many applications outside of group contexts (for example, delegation of authority between individuals, authorization of Non Person Entities (NPEs), that is, machine processes to act on behalf of a user) that are not emphasized here but are contemplated in the disclosure of the technique. As noted above, the disclosed implementations include a cryptographic method to incorporate complex authorization structures in simple transaction signing methods permitting various authority structures to be expressed in group (or other) contexts within a decentralized computing platform.

FIG. 2a schematically illustrates the separation of authentication and authorization as a method of transaction execution on DLT systems in accordance with disclosed implementations. At 202 the initiator is authenticated using public/private key or other known techniques such as login/password, or biometrics. A transaction is proposed, and a cryptographic component needed for transaction signing is released, as disclosed in detail below. At 204, an authorization of the proposed transaction in the context of the group (or other entity) is assessed, as disclosed in detail below. If authorized, the components needed to publish the transaction are present. Other required authorization processes, such as approval from an accounting system, may be injected in a similar manner. Once all cryptographic components are in place, a valid transaction can be published with the required signature to execute on the network, at 206, resulting in a transaction initiated under the group or entity's authority. If the initiator's authority is removed according to group processes, sufficient cryptographic elements cannot be produced to sign the transaction. Technical details of this process are disclosed below.

FIG. 2b is an overarching UML illustration of the process of cryptographically linking authentication and authorization in accordance with several disclosed implementations. Specific authentication models, authorization frameworks, and signing techniques are disclosed in detail in subsequent sections. To exercise group authority (decrypt and operate a group wallet), the initiator, a natural person (or subgroup of persons), engages a process that includes cryptographically linked authentication and one or more authorization processes. The access token and a shared secret is used to bind the authentication and various authorization processes.

As shown in FIG. 2b, at 1, an actor (e.g., an individual or a subgroup of individuals) authenticates (through a conventional centralized mechanism, for example) and receives an access token that can include an associated expiration date. At 2, the actor initiates transaction through a computer network request to an Application Programming Interface (API), event bus, or other compute process, referenced as a Transaction Engine. The Engine validates the access token, encrypts it using a symmetric encryption technique (AES-256 or similar) using a shared secret. At 3, the Transaction Engine calls a process, Transaction Builder, to formulate a transaction in using the desired syntax for the target distributed ledger. The transaction payload will include the encrypted access token. The Transaction Builder will designate the required signatures for the desired transaction. At 4, the Transaction Engine validates the linkage between the access token and the designated signatories and initiates a request to a Transaction Signing Service (TSS). At 5, the TSS initiates an authorization process for each required signature as designated by the Transaction Builder. Each signer has a designated signature provider. At 6, the Provider executes the linked authorization process using any of the disclosed implementations including Split Key Encryption, Multi-Party Computation, Multi-signature, or Self-sovereign signing techniques. Each implementation is disclosed in greater detail subsequently. As a general pattern the Signing Provider consults with the designated Authorization Provider for the signing wallet. At 7, the Authorization Service receives the proposed transaction payload, decrypts the payload to obtain and validate the access token, then reviews the proposed transaction by consulting one or more authorization processes (specific implementations disclosed later) to verify the initiator's right to affect the transaction on behalf of the entity and if approved, the service provides the needed components to enable the Provider to sign the transaction and return the signed transaction to the TSS. At 8, the TSS combines the required signatures into a single payload and returns to the Transaction Engine for publication to the target network or distributed ledger.

Each implementation links the authority of a group to an individual, process, or empowered subgroup in the context of a signed transaction without providing the actor direct access to the group's source of authority within a decentralized network—its private key. The actor may only exercise the authority of the group so long as the assignment (e.g., membership, role, or process) is valid. When a party exercises authority, a delegation chain demonstrates how the authority was obtained and provides traceability as to which member exercised the authority under what context. Processes run by individuals or groups can be used to administer the delegation chain (membership list). These authority structures can exist off chain or on chain. In conventional decentralized networks, all actors acting under authority of an entity would have to have access to the entities secret key and there would be no evidence of which one of the actors signed any particular transaction.

One implementation that can be used to link separated authentication and authorization processes is to encrypt the entity wallet's secret, that is its signing key, using symmetric encryption, such as Advance Encryption Standard (AES)-256 or related method, where the key used to encrypt/decrypt the wallet is composed of several fragments. These fragments are then assigned to the processes which are being linked, in this case authentication, transaction formulation, and authorization processes. Each process must contribute its fragment to produce the key needed to express the group's authority, that is sign and affect a transaction.

To separate the signing processes, the secret is encrypted using symmetric encryption. All (two or more) key fragments must be present in order to decrypt the secret used to sign the transaction based on the algorithm set forth below:

key'=SHA(authentication process fragment A authorization process fragment A other protection key(s))
EncryptedSecret=AES(Secret, key')
Where:
key' is formed by applying a hashing algorithm to 2 or more fragments,
SHA is the Secure Hashing Algorithm or similar hashing technique, and
AES is the Advanced Encryption Standard or similar symmetric encryption technique These key fragments are stored separately, with each fragment only accessible to its respective process, and provide a cryptographic linkage between the processes. Implementations can link a process to its stored fragment using key encrypting keys.

EncryptedFragment=AES(process fragment, process key encrypting key)

To decrypt the secret required to sign the transaction on behalf of the entity, all key fragments must be presented to recreate key'. Therefore, each process must be completed independently in order to produce the fragments needed to decrypt the signing secret. This method ensures independent completion of the authentication and authorization process and enables a range of authorization methods to be used together or independently within a decentralized computing environment as described below.

To utilize the key fragment technique, the user authenticates (proof of identity) using well known "off-chain" methods (such as username/password, multi-factor, and biometrics) and receive an access token, i.e. an off-chain cryptographically signed data packet, from the trusted authentication source. Using this access token, the user proposes a transaction through a system which validates the access token, formulates the transaction to be signed, symmetrically encrypts the access token with a shared secret with the authorization service (access context), formulates the proposed transaction, and provides a key fragment representing the source of the formulated transaction. Separately, an authorization service decrypts access context to obtain the access token using a shared secret, validates the access token, verifies the initiator's rights in the group context to perform the transaction, and if approved, provides a second fragment used to decrypt the secret used to sign the transaction. These fragments are combined along with other fragments as desired to provide proof of authentication and authorization in the context of the transaction signing.

The access token tied to a user's credential is only available in-session. The initiator must be actively engaged to execute authority and cannot be impersonated. Encrypting keys used to encrypt fragments can be stored in vaults that are generated at system implementation, are "untouched by human hands", and are only accessible through approval processes involving multiple independent actors. This access produces a unique alert and results in a key rotation once the system is restored.

This technique provides security benefits, separation of duties, split knowledge, and dual control. The unique structure of the disclosed implementations provide additional benefits. For example, identity and transaction components can be physically separated and independently developed services, reducing insider threat and attack vectors that involve a compromised system or theft of data. To further ensure separation, it is possible that authorization and transaction formulation services may be owned and hosted by independent entities.

The linking authentication and authorization processes in the context of a proposed transaction enables a very powerful model, risk-based authentication, for decentralized transactions. For risk-based authentication, the level of authentication of an actor can depend on the nature of the transaction they are attempting. For example, if an actor proposes a $10 transaction, the authorization process may not require any extraordinary authentication technique. However, if the actor proposes a $1,000,000 transaction from a foreign country, the authorization system may require additional levels of authentication, such as biometrics, or even out of band approval. Without linking the authentication, transaction formulation, and authorization processes in a cryptographic context, scalable decentralized models for this workflow are challenging, fragile, and vulnerable to cyber attack.

Figure 3:
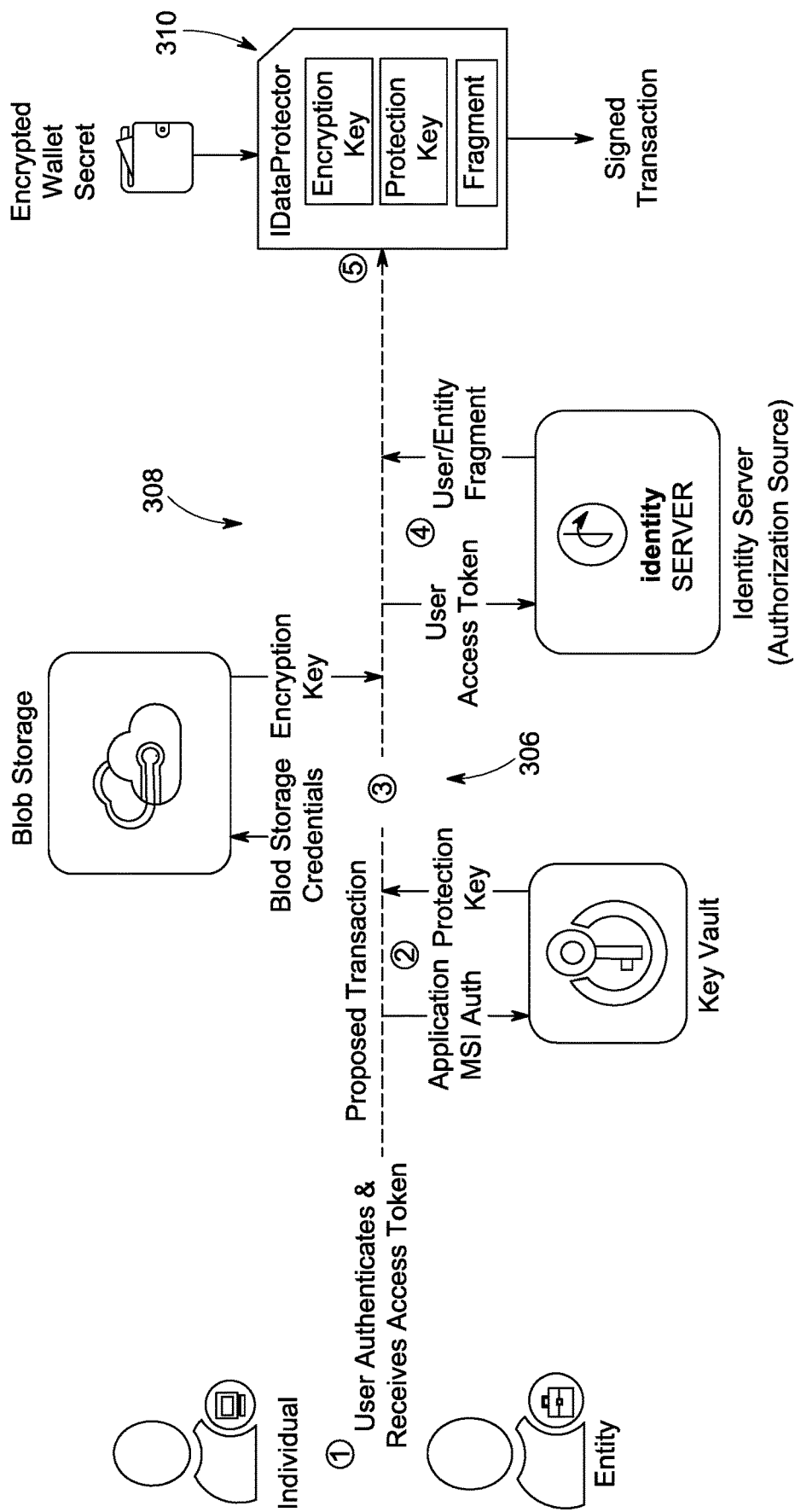
FIG. 3 is a data flow diagram of an example of authentication and authorization in accordance with disclosed implementations.

FIG. 3 illustrates an example of authentication and authorization in accordance with disclosed implementations. To exercise group authority (decrypt and operate a group wallet), a natural person (or subgroup of persons) must obtain at least 2 different key fragments including: 1) a Protection Key Fragment (which represents the authentication process); and 2) an Entity Key Fragment (which represents the authorization process)

As shown in FIG. 3, at 1, an actor (e.g., an individual or a subgroup of individuals) authenticates (through a conventional centralized mechanism, for example) and receives an access token that can include an associated expiration date. At 2, a transaction formulation process validates the access token (formulates the transaction, and provides a protection key fragment representing a successful authentication process to thereby accomplish authentication within the decentralized environment. At 3, the user's credentials are stored and a user encryption key is generated. At 4 an authorization service verifies the access token and determines the initiator's right to act on behalf of the group. If authorized, an authorization (user/entity) fragment is provided. Additional processes may be represented by providing additional key fragments. At 5, a Transaction Signing Service (IDataProtector) assembling the fragments to decrypt the wallet's secret. The service signs the transaction using the wallet private key. Note that wallet signing may use single key, multi-sig, MPC methods, or other conventional methods.

Figure 4A:
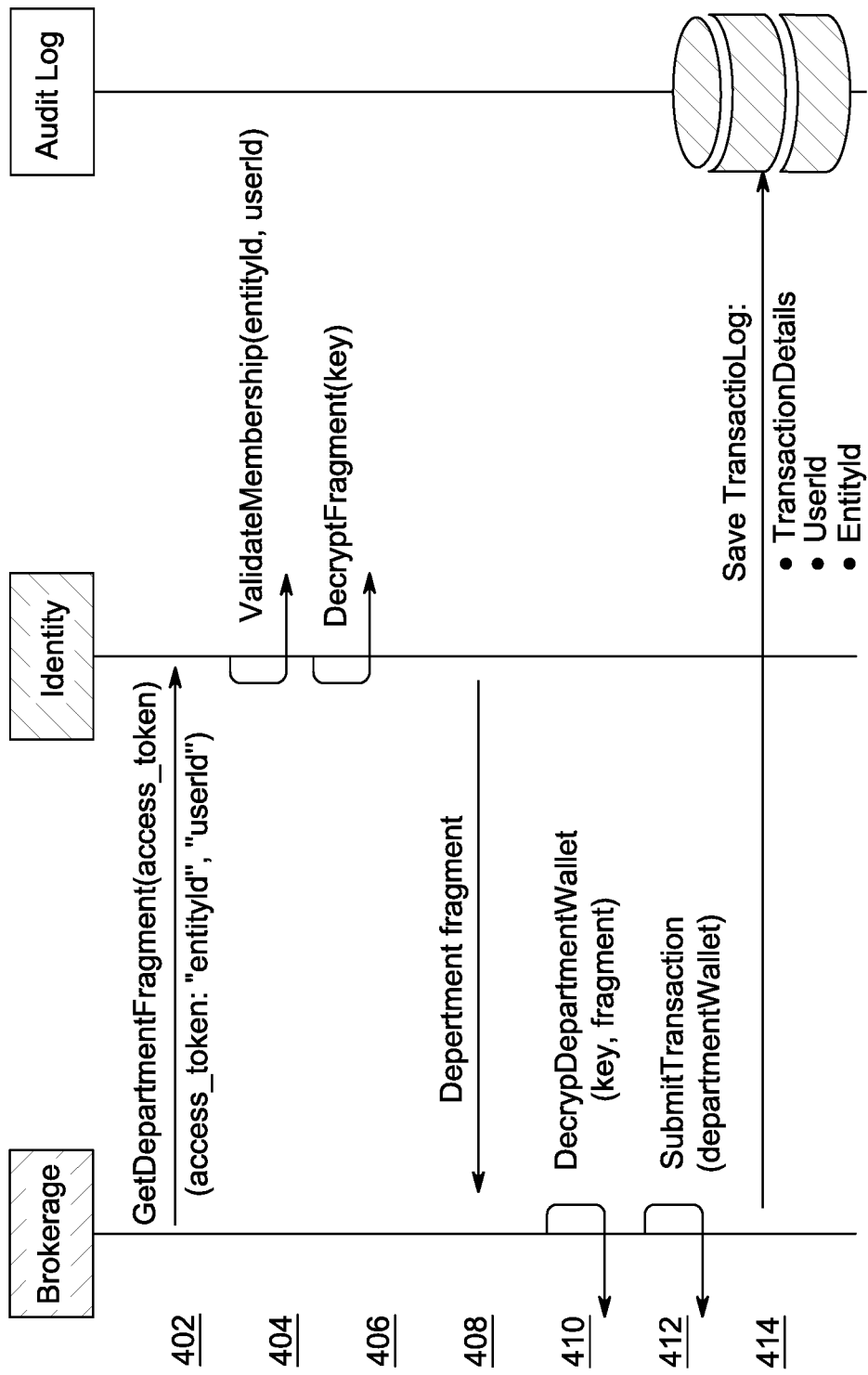
FIG. 4a is a data flow diagram illustrating a messaging protocol in accordance with disclosed implementations.

FIG. 4a illustrates an architecture and messaging protocol of an example implementation in which an individual (actor) signs a transaction as an agent of a brokerage (entity) after obtaining authority to operate a group (department in this example) wallet. After authenticating and receiving an expiring access token, at 402, the actor requests a department key fragment from an Identity Server by providing the access_token data structure to authorize the request. At 404, and Identity Server validates access_token, parses entityId and userId from the access_token data structure and validates that the user has permission to access a department key fragment. At 406, the Identity Server decrypts the department fragment using key encrypting key and, at 408, sends the decrypted department fragment to the actor. The Signing Key for the department wallet is decrypted using the Encryption Key, the Protection Key, and the Department Fragment at 410 and the Transaction is submitted using the wallet and the decrypted secret at 412. At 414, the signed transaction including an initiator identifier is published to the distributed ledger. The identifier allows an auditor to see, e.g., "Initiator took Action on behalf of Department XYZ".

In an additional implementation of the disclosed pattern, Multi-Party Computation (MPC) can be used to separate the authentication and authorization processes involved in transaction signing. MPC signing techniques are well known by those of ordinary skill in the art and thus are not described in detail herein. In general, MPC techniques split transaction signing mathematically such that no party or process can produce the secret required to sign a transaction, but parties acting together as approvers can produces a signing authority. This disclosure uses the cryptographic linkage property of MPC techniques to split the ability to affect a transaction between separated authentication and authorization processes using the novel pattern of the disclosure. In disclosed implementations, MPC transaction approval authority can be split between multiple services. One service, responsible for forming the proposed transaction, validates the initiator's authentication status by using an expiring access token produced by an authentication server (as described in the previous implementation), for example. Once validated, the service formulates the proposed transaction, encrypts the access token using symmetric encryption and a shared secret (access context), adds the access token to the transaction payload, and publishes the immutable payload with its approval to an transaction signing service (or other communication channel) for messaging to one or more authorization services (approvers). A separate authorization service retrieves the transaction signing service message, decrypts the access context using the shared secret to obtain the access token, validates the access token and transaction source, checks whether the transaction is authorized using one or more processes and approves using the second MPC signature. Additional fragments may be applied for further validation of the transaction. If, and only if, sufficient fragments are present the transaction is signed.

Figure 4B:
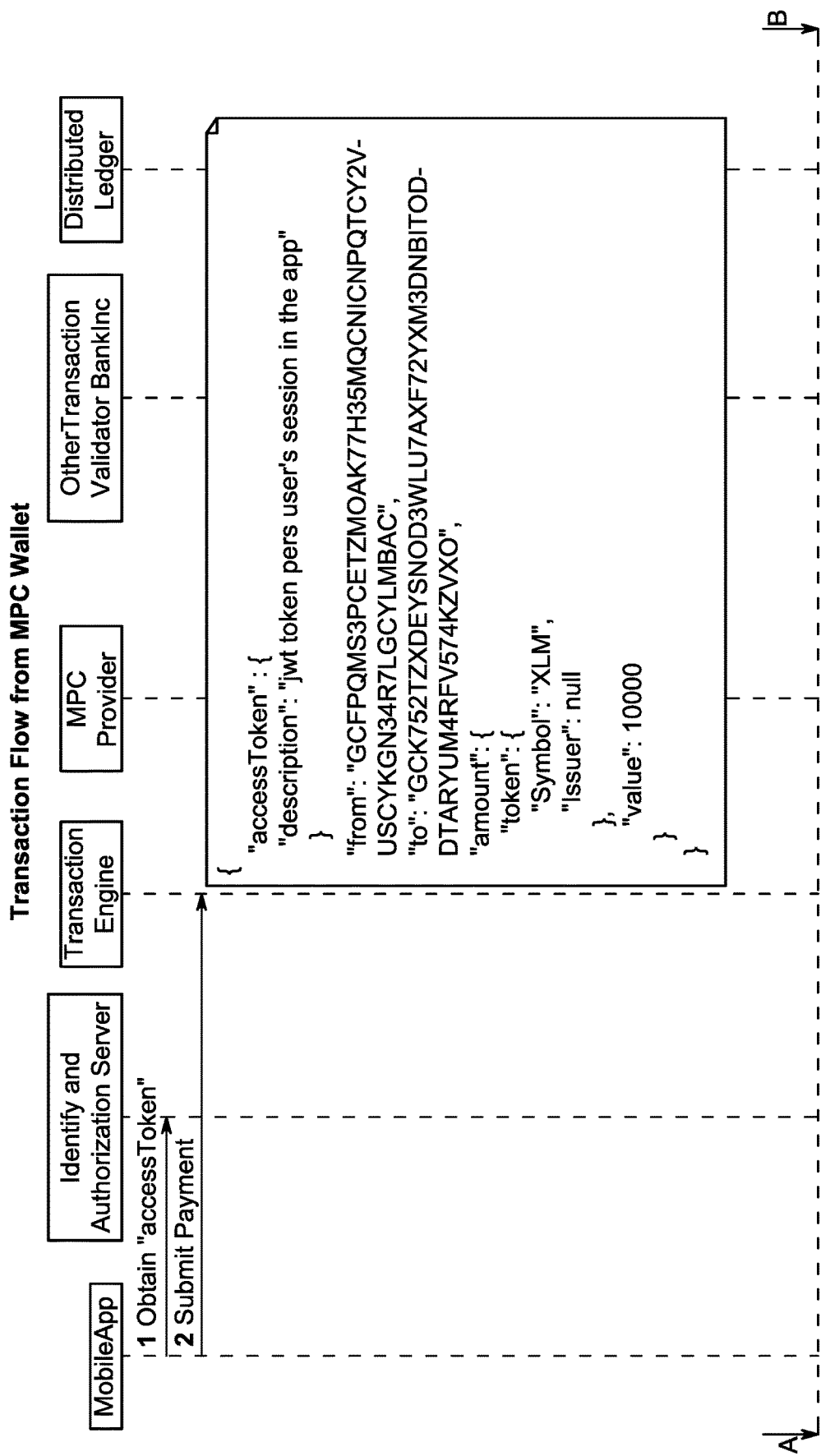
FIG. 4b is a UML illustration providing more detail on the information exchange between participants in a signing sequence in accordance with disclosed implementations.
Figure 4C:
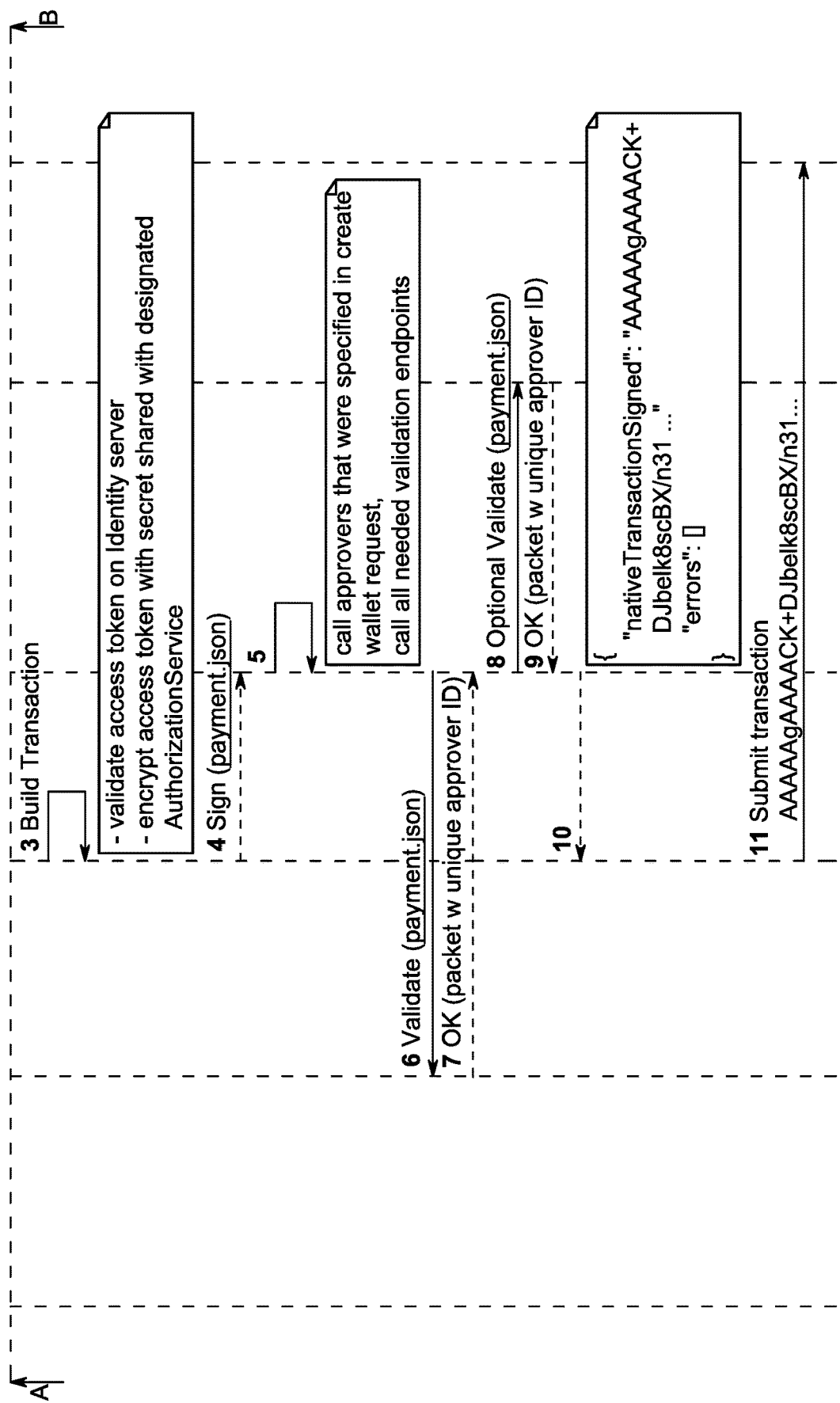
FIG. 4c is a continuation of the UML illustration of the process of cryptographically linking authentication and authorization in accordance with disclosed implementations.

FIG. 4b is a UML illustration providing more detail on the information exchange between participants in a signing sequence. At 1, the initiator authenticates via the identity and authorization service using a mobile device to obtain an access token. At 2, the initiator submits a proposed payment on behalf of the entity to the Transaction Engine (nominal payload shown). At 3, the Transaction Engine validates and encrypts the access token with a shared secret, and builds the payload for the target distributed ledger including the entity wallet and encrypted access token. At 4, the Transaction Engine signs the transaction and submits to the MPC Provider (via a Transaction Signing Service). At 5, the Provider notifies required approvers (containing authorization services). At 6, the Authorization Service decrypts and validates the access token using a shared secret, validates the initiator's right on behalf of the entity. At 7 if valid, the authorization server approves providing an MPC signature. At 8 and 9 (optional), other approval services can be engaged using the same pattern. At 10 after all approvals are obtained, the signed transaction is returned to the transaction engine for publication to the network or distributed ledger at 11.

Figure 5:
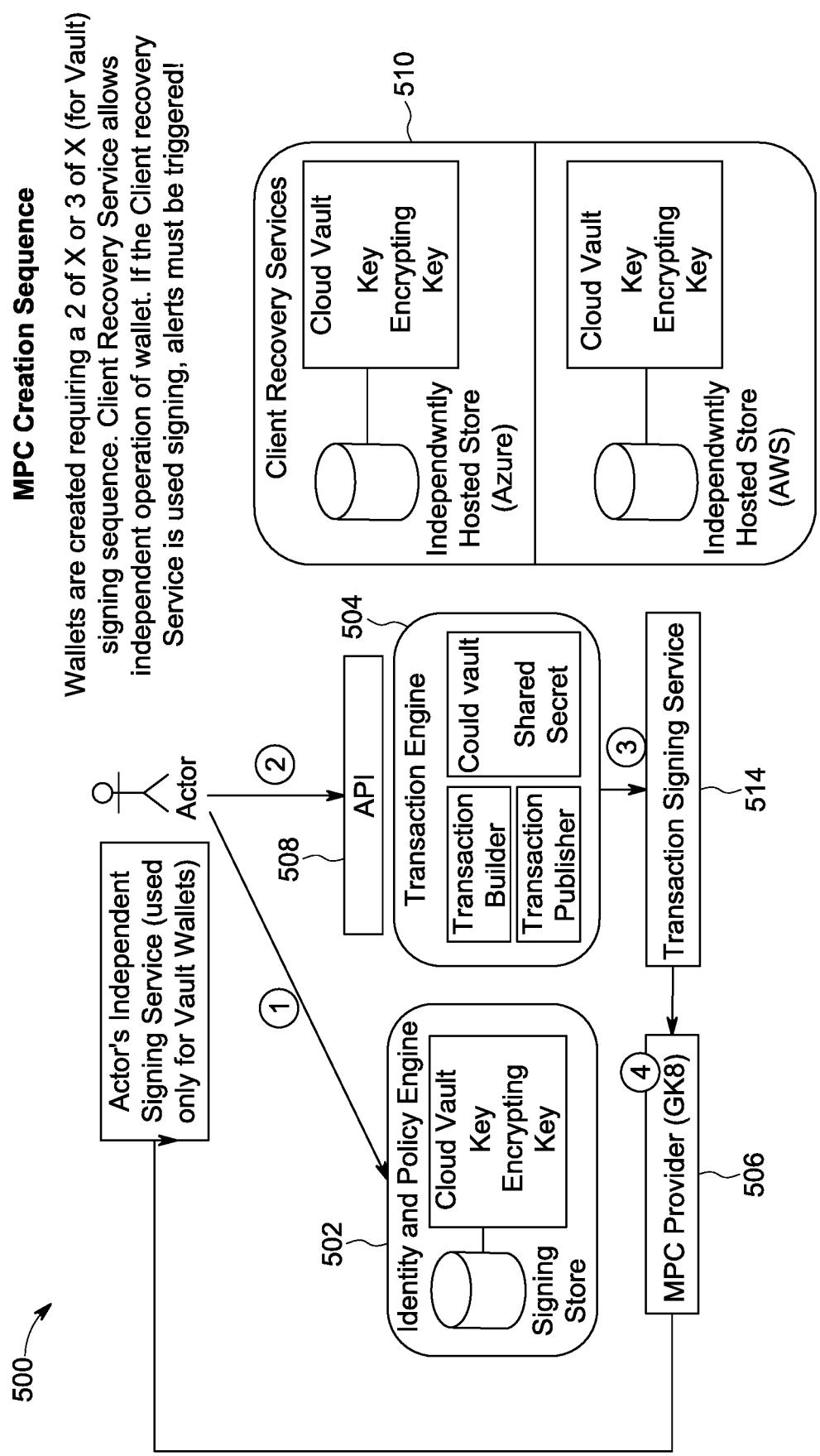
FIG. 5 illustrates an architecture and MPC creation sequence in accordance with disclosed implementations

A Multi-Party Computation (MPC) can be leveraged to separate the authentication and authorization processes. FIG. 5 illustrates an architecture and an MPC creation sequence in accordance with disclosed implementations. The architecture 500 includes Identity and Policy Engine 502, Transaction Engine 504, MPC Provider 506, API Module 508, Client Recovery Services 510, and transaction signing service 514. Each of these components are described in greater detail below in connection with various operations of the disclosed implementations. Client Recovery Services 510 allow independent operation of the wallets, as described below. Further, alerts can be triggered to notify stakeholders of wallet operation. The various wallets can be "vault wallets", i.e. hardware devices that serve to sign or approve a transaction. As discussed below, the wallets can be provided as a service in a known manner.

As shown in FIG. 5, at 1, an Actor logs in using Mobile App via Identity Service to receiving an Access Token. At 2, using a Mobile App, the Actor requests a transaction via the Transaction Engine API. At this point, the Actor's Access Token is validated by the Transaction Engine. At 3, the Transaction Engine builds the requested transaction, that is, it creates the payload for the proposed transaction in a schema required for the target distributed ledger. At 4, the Transaction Engine publishes the proposed transaction to the Transaction Signing Service. The transaction includes the Access Token encrypted with a Shared Secret between the Transaction Engine and the desired Identity and Policy (Authorization) Engine. Note: different wallets may have different policy servers based on "host". At 5, for the designated wallet, the Transaction Signing Service publishes the transaction to the MPC Signing Service (first approval). Other providers (multi-sig, self-signed or HSM, split-key may be added by following the same pattern). At 6, the MPC signing service requests approval from Authorization Service(s) (Identity and Policy Engine). At 7, the Authorization Service decrypts and validates legitimacy of Access token, consults with Policy governing transaction (if any). If authorized, the Authorization Service approves the transaction to meet 2 of X standard. If authorization fails, the failure reasons are logged with the denial. If required, such as for vault wallets, at 8, the Actor approves the transaction using an Independent Approval Service (usually on a mobile device). Other approval services may be involved as required for specific applications. At 9, once required approvals are obtained, the proposed transaction is signed and returned to the Transaction Signing Service. At 10, the signed transaction is sent to the Transaction Engine for publication and, at 11, the signed transaction is published to the decentralized ledger, such as a blockchain ledger.

For Vault functions, the actor's Independent Signing service can be registered with the Transaction signing service. Each service acknowledges wallet creation. The Group wallet is then available for use from Mobile App by parties who have been assigned rights to the group. Wallets can be signed using a 2 of X for a 3 of X (for a Vault) signing sequence. Both Transaction Engine and Identity Policy Engine can be required to sign to initiate a transaction. Policies are enforced by a signature of an Identity/Policy Engine.

Figure 6:
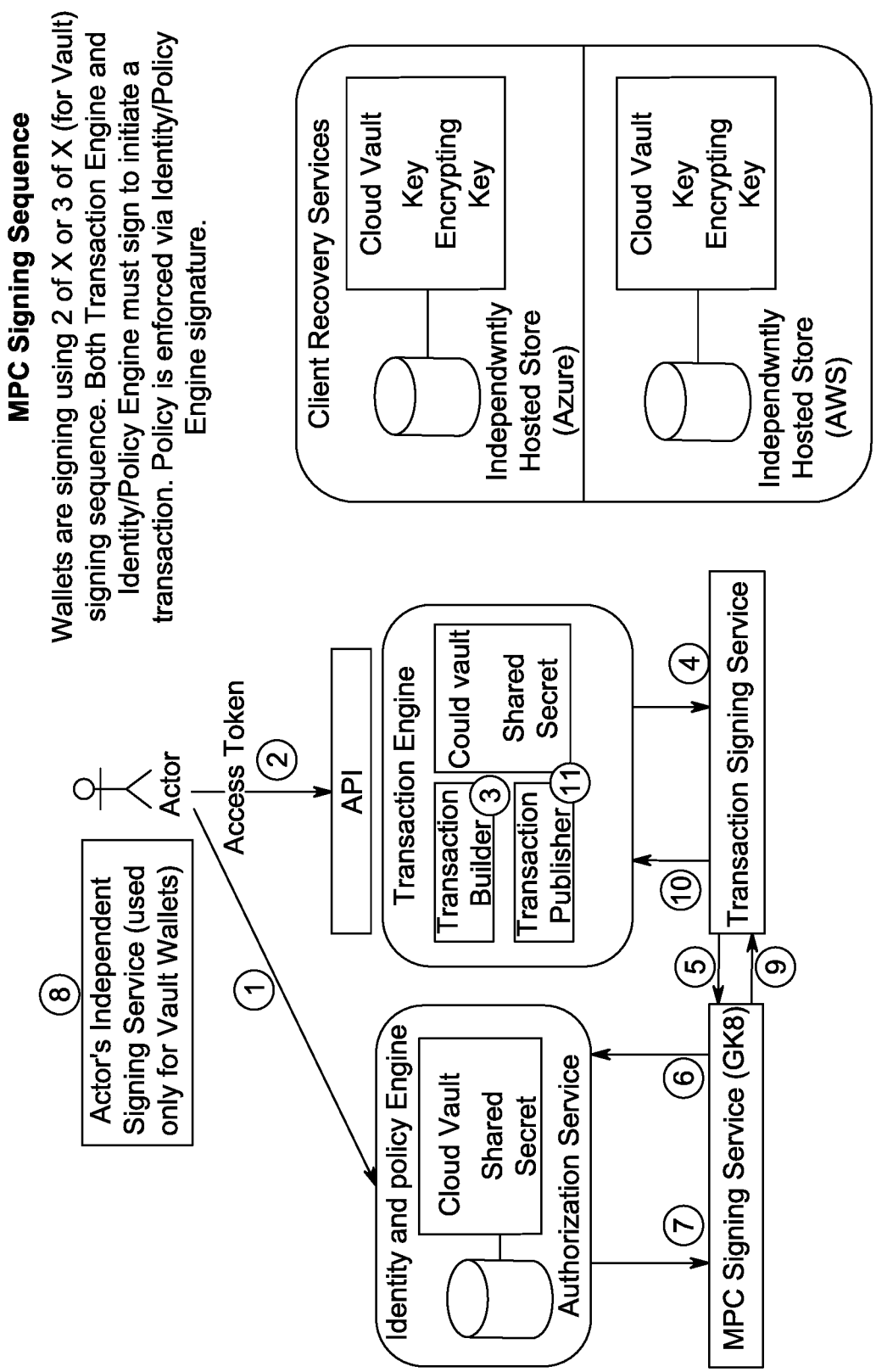
FIG. 6 illustrates an MPC signing sequence in accordance with disclosed implementations.

FIG. 6 illustrates an MPC signing sequence in accordance with disclosed implementations. At 1, the user logs in using Mobile App via Identity Service that has received the user's Access Token. At 2, using Mobile App, the user requests a transaction via the API of the Transaction Engine. The user's Access Token is validated by the transaction engine. At 3, the Transaction Engine initiates a transaction event via the MPC provider, encrypts the Access Token using symmetric encryption techniques (such as Advanced Encryption Standard AES-256) and a shared secret & publishes the event including the proposed transaction, the encrypted access token, and other metadata as desired to an Transaction signing service at 4. This step represents the authentication and transaction formulation process. At 5, an Identity Service of the Identity and Policy Engine detects a signing event from the Transaction signing service, decrypts the transaction payload using a shared secret including the access token, validates legitimacy of the Access Token, validates the authority of the user/data transaction initiator in the context of the group and/or transaction, and if approved, signs (approves) the transaction to meet 2 of X standard. If needed (e.g., for Vault Wallets), the user can be required to sign the transaction using Independent Signing Service (e.g., on a mobile device). A Vault Wallet is a wallet using the disclosed transaction signing pattern that requires an additional out of band approval by the Actor or another party independent of the authentication and authorization process. This signing may involve a known hardware-based signing mechanism.

Figure 7:
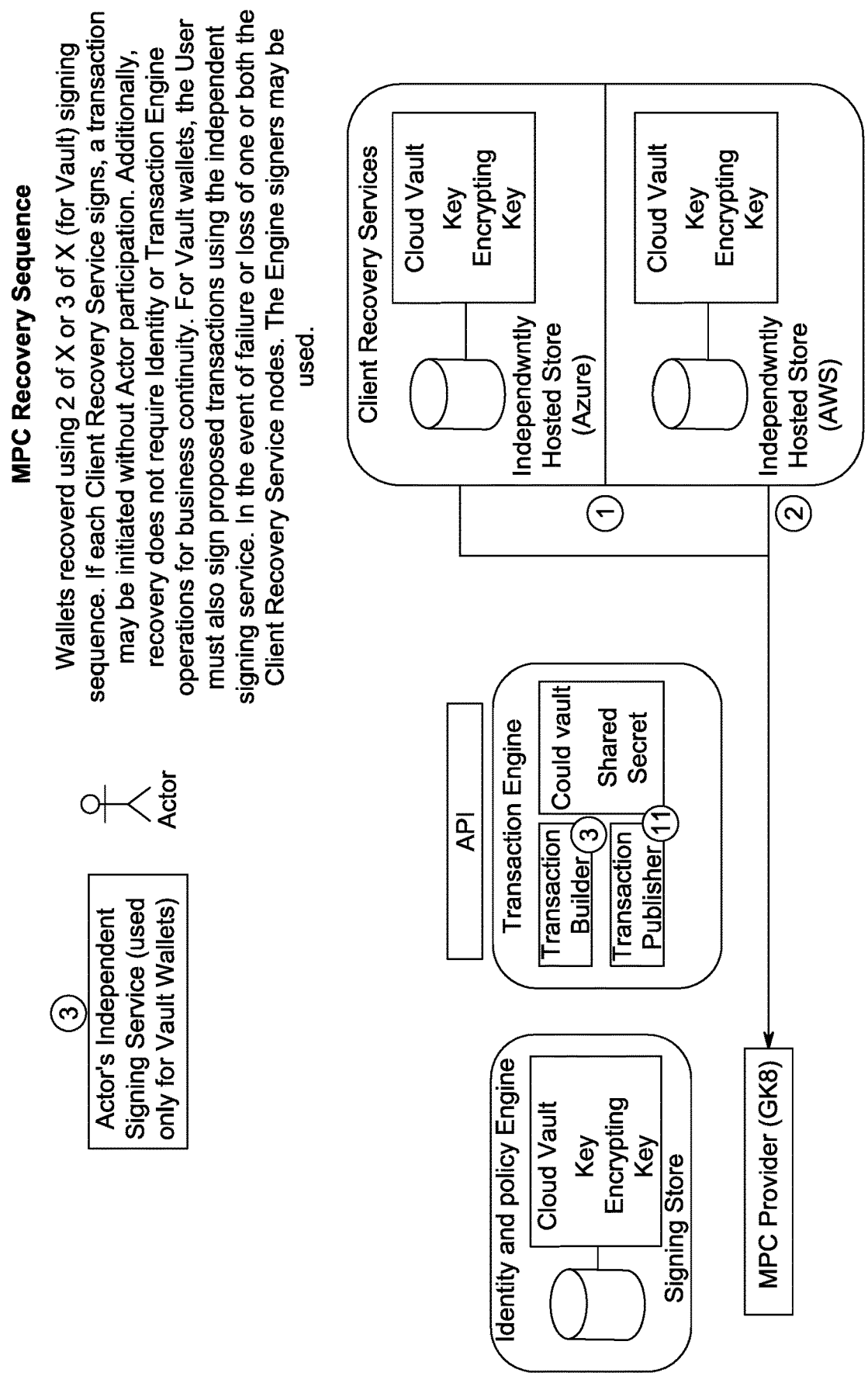
FIG. 7 illustrates an MPC recovery sequence in accordance with disclosed implementations.

FIG. 7 illustrates an MPC recovery sequence, accomplished by Client Recovery Services in accordance with disclosed implementations. Wallets can be recovered using a 2 of X or a 2 of X signing sequence. If each Client Recovery Service signs, a transaction may be initiated without user participation. Also, recovery does not require Identity or Transaction Engine operations for business continuity by bypassing the authentication and authorization techniques disclosed herein. For vault wallets, the user can also be required to sign proposed transactions using the Independent Signing Service. In the event of failure or loss of one or both of the Client Recovery Service nodes, the Engine signers may be used. As shown in FIG. 7, at 1, either node in the Client Recovery Service initiates a recovery transaction (usually delivery of value to a new address). At 2, the Independent node validates and signs the recovery transaction. If needed (e.g., for Vault Wallets), the user can sign the transaction using an Independent Signing Service at 3.

Signing authority for wallets can also be delegated to Non-Person Entities (NPEs). For example, this technique can be used for scheduled payments, bridge transactions such as hypothecation, or process-based transactions, such as a hot function of a custody wallet, i.e. a wallet that is connected to the internet.

Figure 8:
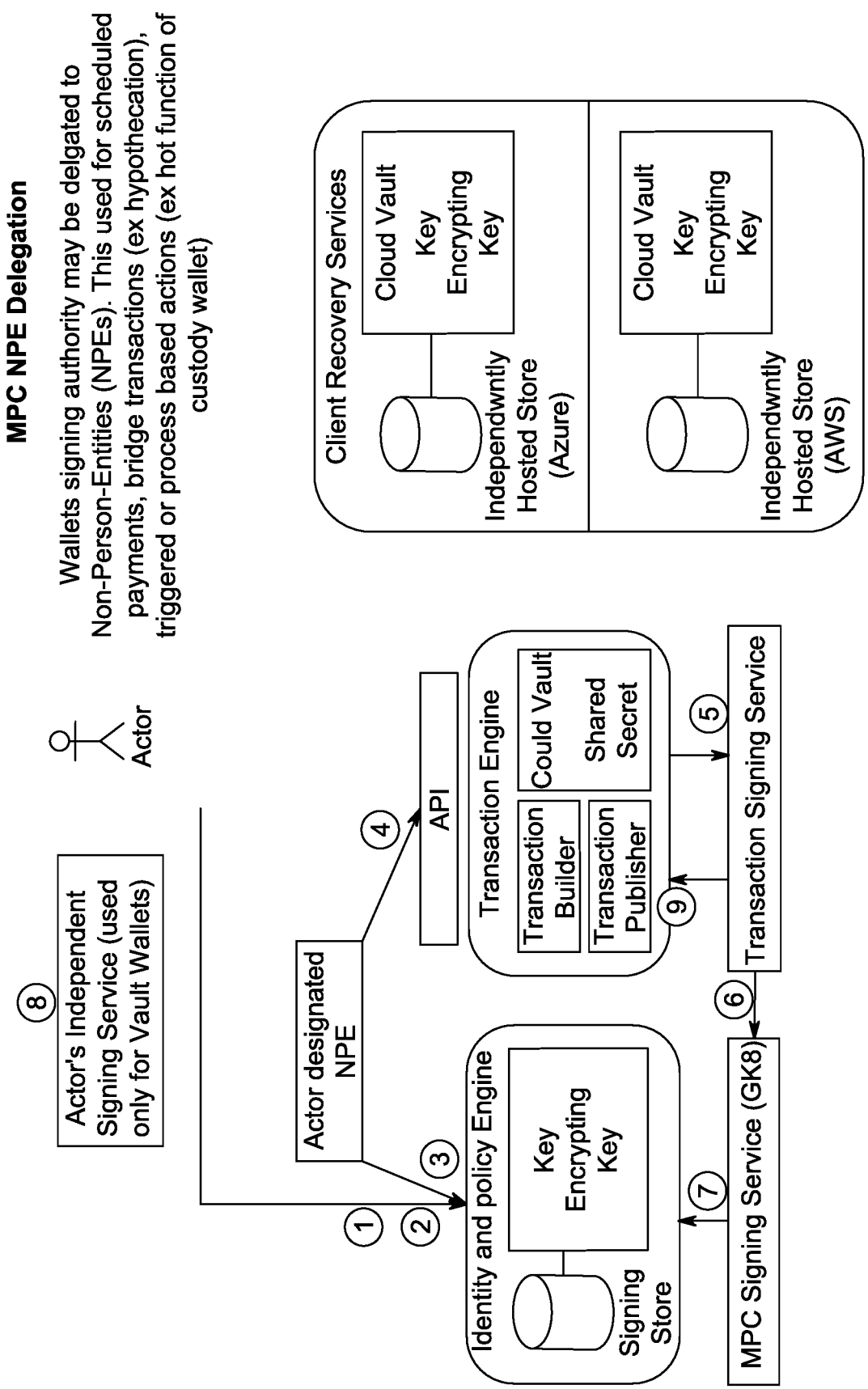
FIG. 8 illustrates a process for delegation of signing authority to an NPE in accordance with disclosed implementations.

FIG. 8 illustrates a process for delegation of signing authority to an NPE. At 1, the user logs in using the Mobile App via Identity Service and transmits their identity token to the Identity Service. At 2, using the Mobile App (or other client device), the user creates a Trigger specifying the Task to be performed and an event, time, or interval under which the user's authority may be used. The Trigger is sent to the Transaction Engine through an API and is stored and is used to assign responsibilities to the NPE. The Trigger creation event is published to the Transaction signing service including the Access Token encrypted with a shared secret and the Trigger payload. The Trigger publishing event can be detected by the Identity and Policy Engine. The Identify and Policy Engine decrypts the Access Token using a shared secret, validates that the Access Token was issued by the Identity source that represents the authorized user. Once validated, the delegation of the NPE's authority to act on behalf of the user in the context of the Trigger is stored in the Signing Store at 3 in a record containing the Trigger, the Initiator, and the delegated NPE identifier among other data. A Trigger can be removed at any time by the initiator. The NPE then registers (login) via Identity Service in the context of a Trigger at 4. The Identity Service validates delegation status in the context of the assigned Trigger. The NPE then receives an access token reflecting this authority.

When the Trigger is activated based on the associated time or detected event, NPE executes the assigned Task usually by calling Transaction Engine API at 5. The NPE's Access Token is validated and the proposed transaction data structure is formulated by the transaction Engine. At 6, the Transaction Engine initiates a transaction event via MPC provider & publishes the transaction to the Transaction signing service. The Identity Service of the Identity and Policy Engine detects a signing event from bus, validates legitimacy of the Access Token, Trigger and Delegation, determines if the transaction is authorized using the authority of the group, and if approved, signs transaction to meet 2 of X standard. If needed (for Vault Wallets, for example), group designated user can be required to sign the transaction the using Independent Signing Service.

Additionally, as shown in FIG. 2*b*, other signing techniques such as multisig models can be substituted for MPC in the flow above. In this case, the signing for authentication and authorization processes use multisig rather than MPC techniques.

A related pattern (separated but cryptographically linked authentication and authorization process), but a different flow than FIG. 2B is once in which authentication and all authorization methods occur on-chain. This pattern does not require an encrypted access token to link the authentication and authorization steps as the smart contract authorization process can only occur in the context of an authenticated wallet transaction.

The implementation of novel smart contract, i.e., executable code stored on a decentralized ledger, allows the creation of contract wallets, i.e., smart contracts that encapsulate wallets and thus can be used to initiate transactions as a proxy for a wallet representing a user or entity, allows the separation of authentication of an initiator (wallet signing a transaction) from authorization process(es) encoded in a smart contract or other source. In this way, an individual with an assigned wallet can initiate a transaction from a smart contract wallet representing an entity's authority. In this case, authentication is performed by the act of the initiating wallet signing a proposed transaction or other state change, and authorization is performed by processes encoded in the smart contract or other sources. For example, this technique can be used to determine if the initiator (signing wallet) is an authorized member of the group with authority based on the nature of the proposed transaction.

In each disclosed implementation, the end result is a signed transaction where the initiator has been authenticated and authorized using separate processes that are cryptographically linked to prevent injection of unauthorized data. The authorization process can be conducted "on-chain" (e.g. by a smart contract executed through decentralized virtual machines) or "off chain" using traditional computing processes linked by an access token. These techniques can be combined for hybrid on/off chain authorization. In other words, the authority to sign a wallet may use the off-chain implementations described, with further authorization steps occurring in series using the "on-chain" authorization steps.

Once authentication and authorization steps have been separated, but linked in the context of a transaction, it is possible to inject many different forms and methods of authorization that are useful in the context of decentralized transactions, especially those that involve corporate authority structures. Various implementations are disclosed for methods of decentralized authorization which can be used together or separately from any of the proposed linking methods described above.

In one disclosed implementation, group structures (i.e., groups and relationship between groups, memberships and/or roles) are recorded on-chain (stored on a distributed ledger) or off-chain (stored in centralized data stores). The initiator's authority to act on behalf of an entity can be derived from these group structures to determine if an actor is authorized to conduct a proposed transaction. If authorized using an on-chain model, the transaction is executed through the entity's contract wallet, a novel structure that enables a transaction to be executed as if the transaction was signed by a public/private key.

The disclosed implementations can combine the separated authentication process with a consensus authorization or voting model. In this implementation, an authenticated user proposes a transaction and initiates a vote, authorized members (often cryptographic token holders) cast their vote, the votes are tallied using configurable methods in the smart contract, and if authorized, the transaction is initiated using the associated contract wallet as taught in the previous implementation.

Disclosed implementations can use business processes stored and configured on the distributed ledger. The disclosed data structure allows configurable business processes involving one or more steps to be inserted in the authorization process for a proposed transaction. These implementations can be used separately or together. Additionally, a decentralized policy enforcement point, as described in U.S. patent application Ser. No. 16/143,058, the disclosure of which is incorporated herein, may be inserted or used in conjunction with other disclosed authorization techniques to determine if a proposed transaction is authorized. Disclosed implementations provide an on-chain approach that includes DLT-native enterprise authentication and authorization models that are decentralized at all levels unlocking the full potential of DLT systems.

In another implementation, a smart contract is used to encapsulate wallets that hold group value and represent group authority. These encapsulated wallets ("proxy wallets") are used to execute transactions on behalf of the group. In this implementation, authentication can occur using any of the methods mentioned above resulting in a signed transaction proposed in a group context. An external smart contract assessing the authority of the initiator in the group context is consulted and if authorized the transaction is initiated via the proxy wallet. This sequence contains the disclosed pattern of cryptographically linking separate authentication (used to sign the transaction) and authorization (via an authorization smart contract) processes. If approved, the transaction is executed on behalf of the entity using an IContractWallet as described below.

Figure 9:
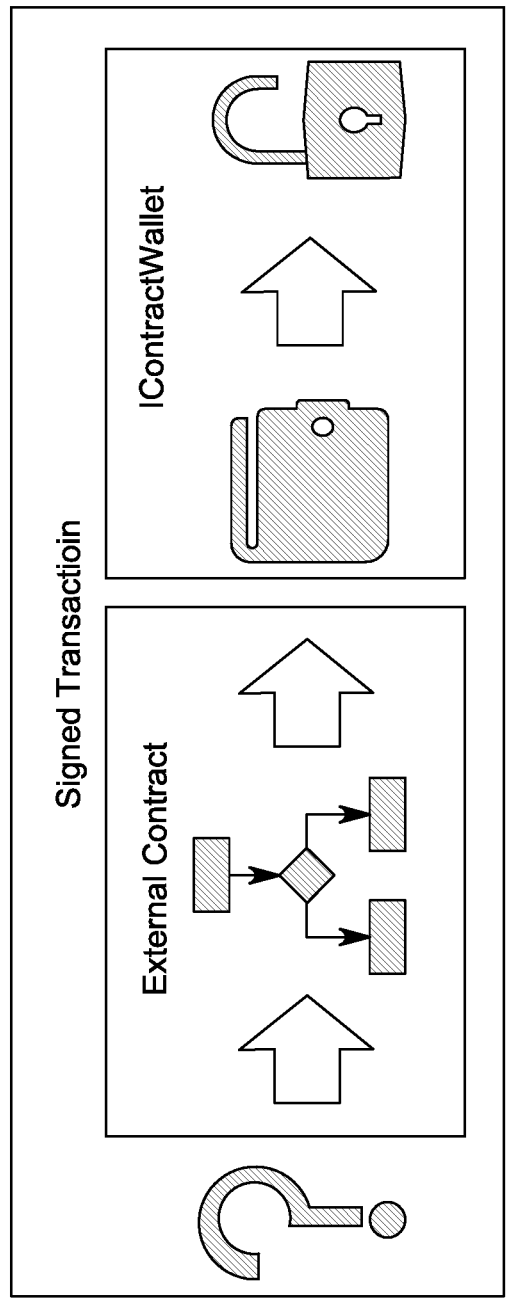
FIG. 9 is a schematic illustration of a Proxy Wallet in accordance with disclosed implementations.

As illustrated in FIG. 9, IContractWallet (a proxy) is used to permit external contracts to operate a wallet without a wallet secret. Sample code for implementing a proxy wallet is set forth below.

```
IContractWallet Interface
pragma solidity >=0.6.0 <0.7.0;
/**
@title Contract Wallet
Designed to be operated by a token or smart contract wrapper
@notice Can hold an ERC-20, ERC-721,
ERC-1400 tokens, and Ether.
*/
abstract contract IContractWallet {
/**
@notice Transfer ether
@param to Ether recipient address
@param value Value to be transferred
@param data (optional) additional data for policy enforcement
*/
function etherTransfer(
address to,
uint value,
bytes calldata data)
external
virtual
returns (bool);
/**
```

```
@notice Transfer an ERC-20 or backward
compatible token with ERC-20
@param token Token address that will be transferred
@param to The recipient address
@param value Value to be transferred
@param data (optional) additional data for policy enforcement
*/
function erc20Transfer(
address token,
address to,
uint value,
bytes calldata data
)
external
virtual
returns (bool);
/**
@notice Transfer an ERC-721 or backward
compatible token with ERC-721
@param token Token address that will be transferred
@param to The recipient address
@param tokenId ERC-721 token id to be transferred
@param data (optional) additional data for policy enforcement
*/
function erc721Transfer(
address token,
address to,
uint token Id,
bytes calldata data
)
external
virtual
payable;
/**
@notice Transfer an ERC-1400 or backward
compatible token with 1400
@param token Token address that will be transferred
@param partition Partition
@param to The recipient address
@param value Value to be transferred
@param data (optional) additional data for policy enforcement
*/
function erc1400TransferByPartition(
address token,
bytes32 partition,
address to,
uint value,
bytes calldata data
)
external
virtual
returns (bytes32);
}
```

IContractWallet is an interface that wraps a smart contract that enables the creation and operation of wallets (e.g., blockchain addresses) that operate within a signed context but do not require a key. These wallets emulate wallets held by users in those transactions on tokens, or other transactions that wallets perform, are permitted. The authority to operate the wallet can be delegated, in the manner described above, to third party smart contracts (the contract that created the IContractWallet), in this case a contract that represents the entity and authorizes initiators to transact with the Proxy Wallet on behalf of the entity.

Figure 10:
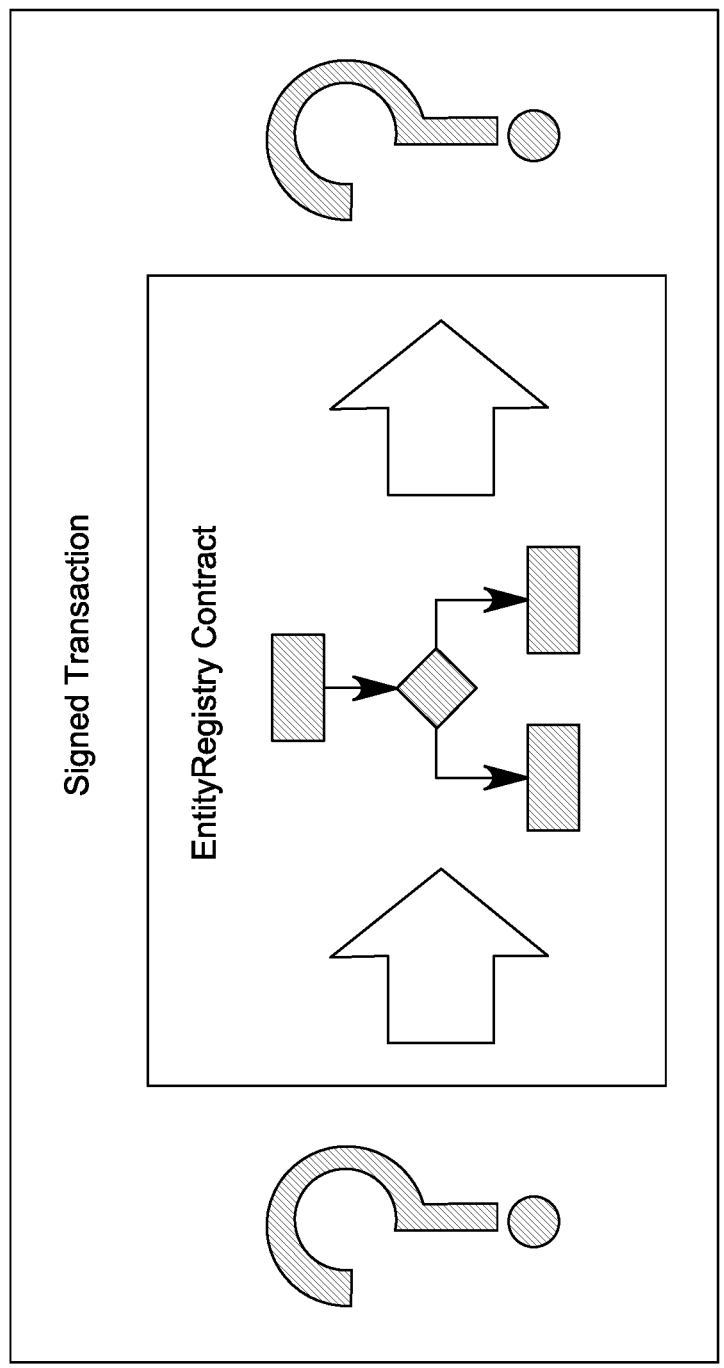
FIG. 10 illustrates an "Entity Token" produced by a smart contract and representing an entity in accordance with disclosed implementations.

FIG. 10 illustrates an "Entity Token" produced by a smart contract and representing an entity. Entity Tokens are non-fungible (e.g., ERC-721) tokens, that represent an individual, group, or non-person entity (NPE) issued via the EntityRegistry SmartContract. These tokens may be assigned an IContractWallet as described in the previous section. The EntityRegistry Contract may consult an Authorization Process to determine the initiator's right to perform a transaction based on logic including assessing the signer's role or affiliation with the entity.

Figure 11:
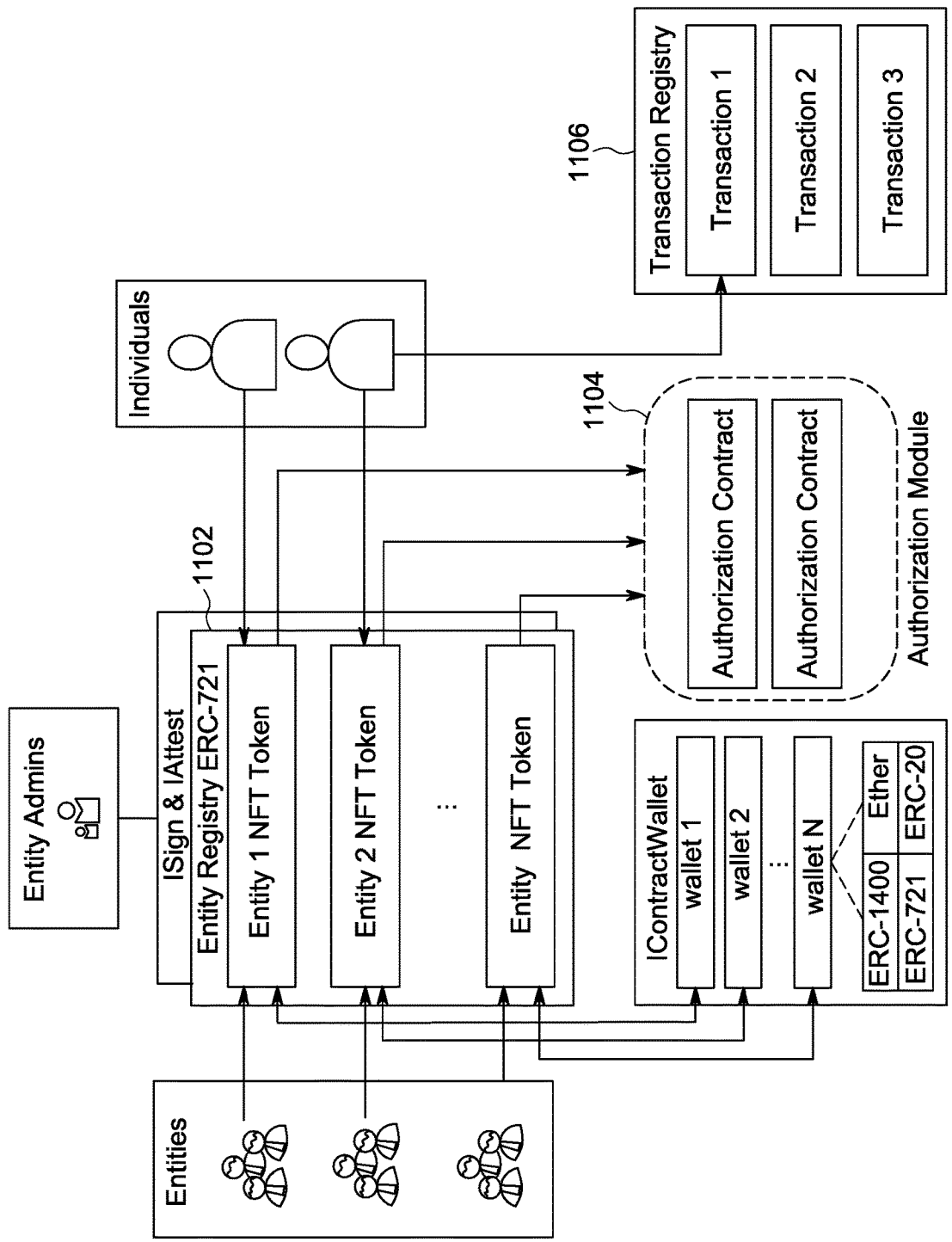
FIG. 11 illustrates the basic structure of an on-chain implementation of group wallets in accordance with disclosed implementations.

FIG. 11 illustrates the basic structure of an on-chain implementation of group wallets to achieve separation of authentication and group authorization in a single transaction. In one example, an individual signs a transaction to move value in Entity #1's wallet. EntityRegistry consults with an Authorization Contract of Authorization Module 1104 to determine if the individual has the right to move value in the Entity wallet based on the individual's affiliation with the entity. In another example, the individual proposes a transaction in Transaction Registry 1106. The individual signs the transaction via Entity 2 token. EntityRegistry 1102 consults with Authorization Module 1104 to execute the transaction. An example of EntityRegistry interface description code is set forth below.

```
pragma solidity >=0.6.0 <0.7.0;
/**
* @title EntityRegistry base contract
*Entities are represented by a non-fungible (ERC721)
tokens and can be owned by one or multiple wallets.
*All Entities will contain an embedded wallet making it
possible to transact with value in the entity context
abstract contract IEntityRegistry {
  /**
  * @notice NFT created
  * @param uuid NFT unique identifier
  */
  event EntityCreated(uint uuid);
  /**
  * @notice NFT removed
  * @param uuid NFT unique identifier
  */
  event EntityRemoved(uint uuid);
  /**
  * @notice Create a request to create the designated Entity NFT
  to the fungible token in exchange for value, creates a purchase order
    * @param uuid NFT token identifier (must be unique)
    * @param name NFT token name
    * @param class (optional) EntityClassRegistry
  class token (class contact & uniqueId)
    * @param data (optional) additional data for policy enforcement
    * @return token Id unique identifier for the issued token
    */
    function createEntity(
      uint uuid,
      bytes32 name,
      address class,
      bytes calldata data
    )
      external
      virtual
      returns (uint token Id);
  /**
  * @notice Remove the entity token
  * @param uuid token unique identifier
  */
  function removeEntity(uint uuid) external virtual returns (bool);
  /**
  * @notice Get the wallet for the entity
  * @param uuid token unique identifier
  * @return class address for the entity's class in the class registry
  */
  function getClass(uint uuid) external virtual returns (address class);
}
pragma solidity >=0.6.0 <0.7.0;
/**
* @title Entity Wallet
* @notice Designed to open a possibility for the entities
that will be represented by an ERC-721 token
* hold another asset that can be presented by an ERC-20,
ERC-721, ERC-1400 tokens and by an Ether.
* Interface must be implemented by an EntityRegistry.
*/
abstract contract IEntityWallet {
  /**
  * @notice Get the wallet for the entity
  * @param entityId token unique identifier
  * @return wallet address for the entity's wallet
  */
  function getWallet(uint entityId) external virtual
  returns (address wallet);
  /**
  * @notice Transfer ether
  * @param entityId ERC-721 token id (registry must have
  a link with a wallet by this id)
  * @param to Ether recipient address
  * @param value Value to be transferred
  * @param data (optional) additional data for policy enforcement
  */
  function etherTransfer(
    uint entityId,
    address to,
    uint value,
    bytes calldata data
  )
    external
    virtual
    returns (bool);
  /**
  * @notice Transfer an ERC-20 or backward compatible
  token with ERC-20
  * @param entityId ERC-721 token id (registry must have
  a link with a wallet by this id)
  * @param token Token address that will be transferred
  * @param to The recipient address
  * @param value Value to be transferred
  * @param data (optional) additional data for policy enforcement
  */
  function erc20Transfer(
    uint entityId,
    address token,
    address to,
    uint value,
    bytes calldata data
  )
    external
    virtual
    returns (bool);
  /**
  * @notice Transfer an ERC-721 or backward compatible
  token with ERC-721
  * @param token Token address that will be transferred
  * @param entityId ERC-721 token id (registry must have
  a link with a wallet by this id)
  * @param to The recipient address
  * @param token Id ERC-721 token id to be transferred
  * @param data (optional) additional data for policy enforcement
  */
  function erc721Transfer(
    address token,
    uint entityId,
    address to,
    uint tokenId,
    bytes calldata data
  )
    external
    virtual
    payable;
  /**
  * @notice Transfer an ERC-1400 or backward
  compatible token with 1400
  * @param token Token address that will be transferred
  * @param entityId ERC-721 token id (registry must have
  a link with a wallet by this id)
  * @param partition Partition
  * @param to The recipient address
  * @param value Value to be transferred
  * @param data (optional) additional data for policy enforcement
  */
  function erc1400TransferByPartition(
    address token,
    uint entityId,
    bytes32 partition,
    address to,
    uint value,
    bytes calldata data
```

```
    )
        external
        virtual
        returns (bytes32);
}
pragma solidity >=0.6.0 <0.7.0;
/**
 * @title Asset wallet factory
 */
abstract contract IEntityWalletFactory {
    /**
     * @notice Deploy new entity wallet
     * @param entityId ERC-721 token id (registry must have
a link with a wallet by this id)
     * @param wallet Address of the deployed wallet
     */
    function newAssetWallet(uint entityId) internal
    virtual returns (address wallet);
}
```

Figure 12:
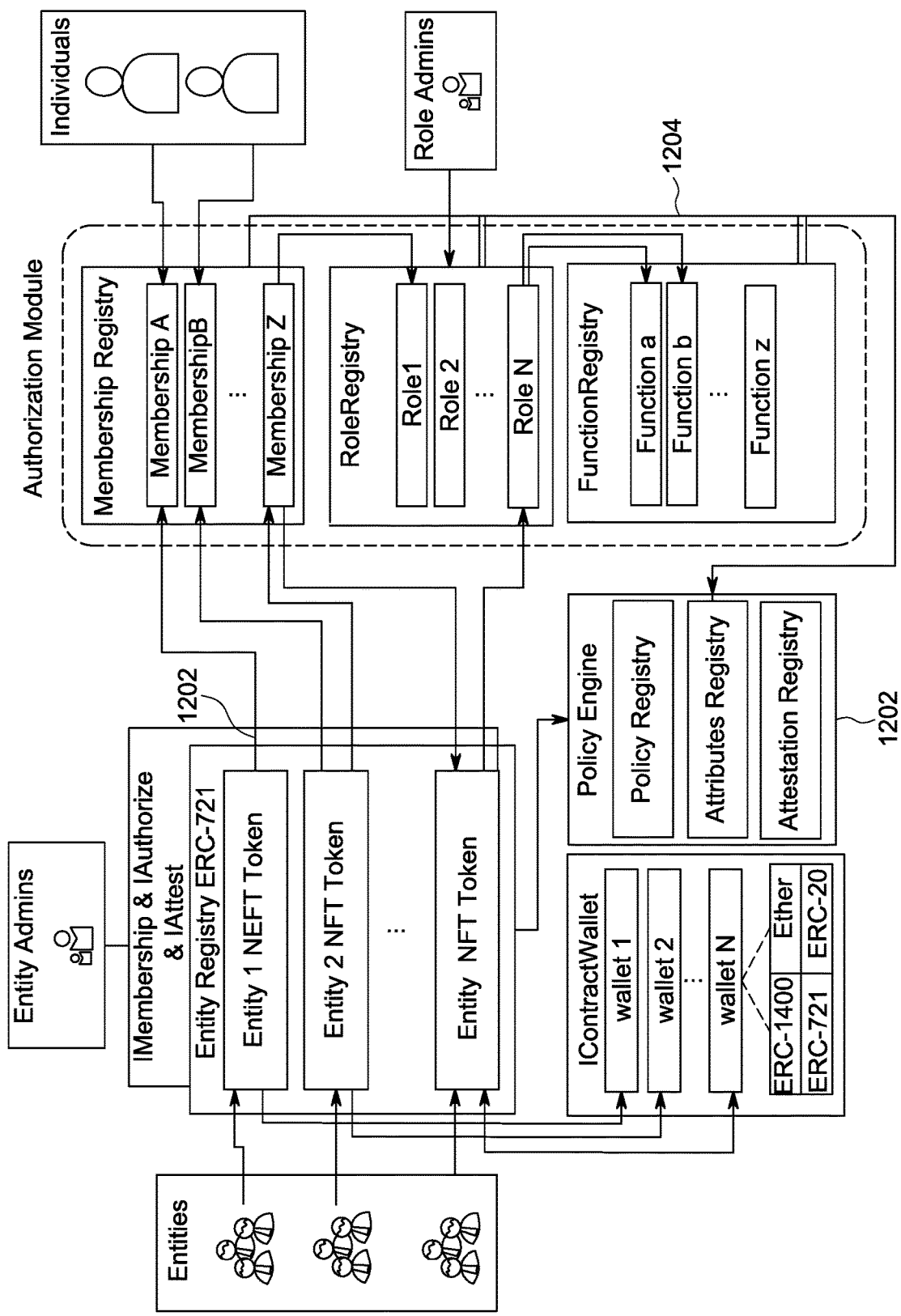
FIG. 12 illustrates a disclosed implementation of an on-chain authorization model in accordance with disclosed implementations.

FIG. 12 illustrates a disclosed implementation of an on-chain authorization model in which an Authorization Module 1104 includes Membership, Role, and Function registries. These data structures, tables for example, are accessed through an IMembership interface and contain the linkages between and among individuals and entities. When an individual attempts to operate an entity wallet, to sign a proposed transaction, or attest to data, an EntityRegistry smart contract consults Policy Engine 1202 and/or Authorization Module 1204 to assess the authority of the individual to perform the transaction in a group context.

Figure 13A:
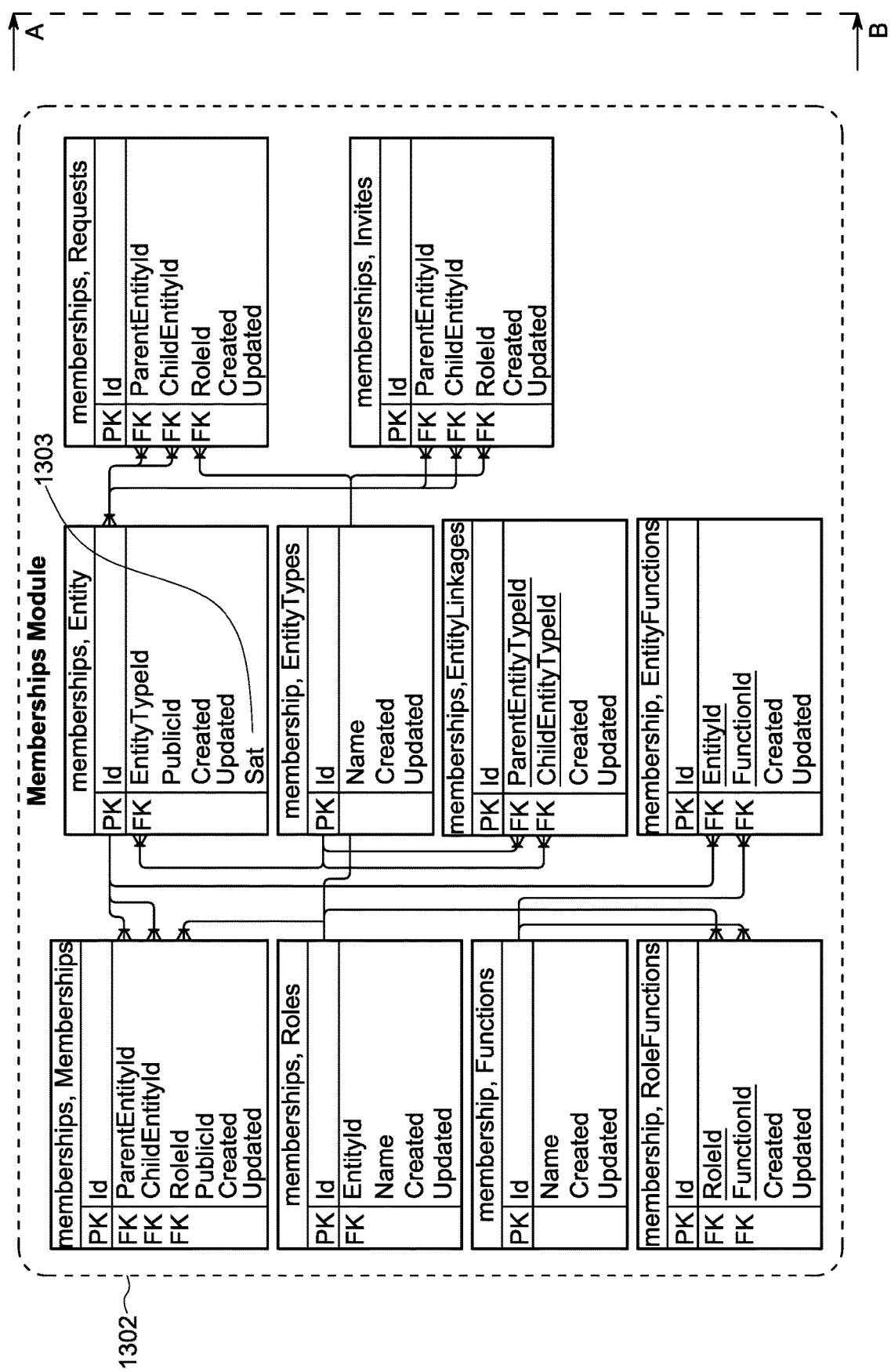
FIG. 13a illustrates an authorization model data schema and data model in accordance with disclosed implementations.
Figure 13B:
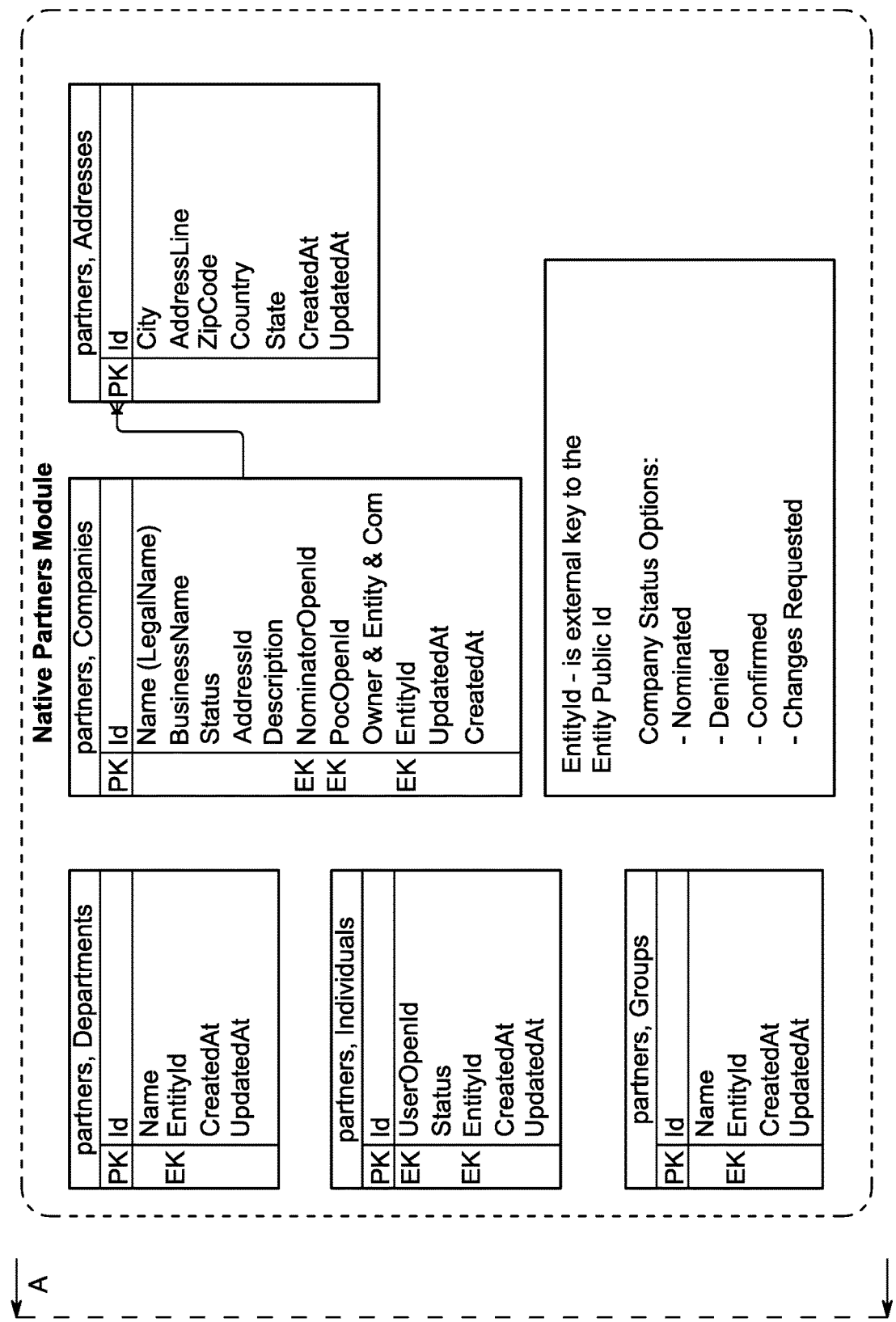
FIG. 13b is a continuation of FIG. 13a, which illustrates an authorization model data schema and data model in accordance with disclosed implementations.

FIG. 13 illustrates an authorization model data schema and data model for on-chain or off-chain implementations. The schema and data model support any class of entity, such as those shown in Membership Module 1302. These relationships are used to determine one's authority to act on behalf of an entity. Salt attribute 1303 in the entity table is used to generate the key fragment needed to decrypt and operate an Entity owned wallet in the manner described above. For example, an entity definition can include an individual, group, or non-person entity. Entity relationships can be nested. In other words, a group may contain another group who has another group. Authorization can be derived from role within a group (context) or can be assigned to an entity via membership. Membership is an entity/role/entity linkage—though it may also be expressed as entity/role, entity/group, or even entity/entity (social media). Examples of authorization structures includes:

Dan (entity-individual) is CEO (role) of Securrency (entity-group)
Dan (entity-individual) is a member (role-default) of Securrency finance department (entity-group)
Securrency Finance (entity-group) is a Department (role) of Securrency (entity-group)
Dan (entity-individual) is a member [role implicit] of Securrency Engineering department (group)
Dan (entity-individual) is an Administrator (role) of Securrency system [entity-group implicit]
Dan (entity-individual) is connected via LinkedIn [role implicit] to John (entity-individual)

Delegation of authority can be derived from membership attributes. For example:

Securrency (entity-group) is Broker (role) for Dan (entity-individual)

With Expiration:

Dan has Approval Authority for John while on vacation (expiring authority)

Dan is Security Offices for the night watch (expiring authority)

Using this data model and schema, a number of models for managing authority in an entity context are possible. For example, authority can be centrally assigned by group administration personnel, any member may add another member, or through affinity with other groups and/or entities. There are also various possibilities for membership types, such as one-way trust (add a member without agreement), and two-way trust (both entities must agree to the addition). Entity visibility can be varied. For example, groups can be only visible to members of the groups or members can be hidden from others in the group. Participation in a group can be through invitation only or based on other conditions.

Figure 14:
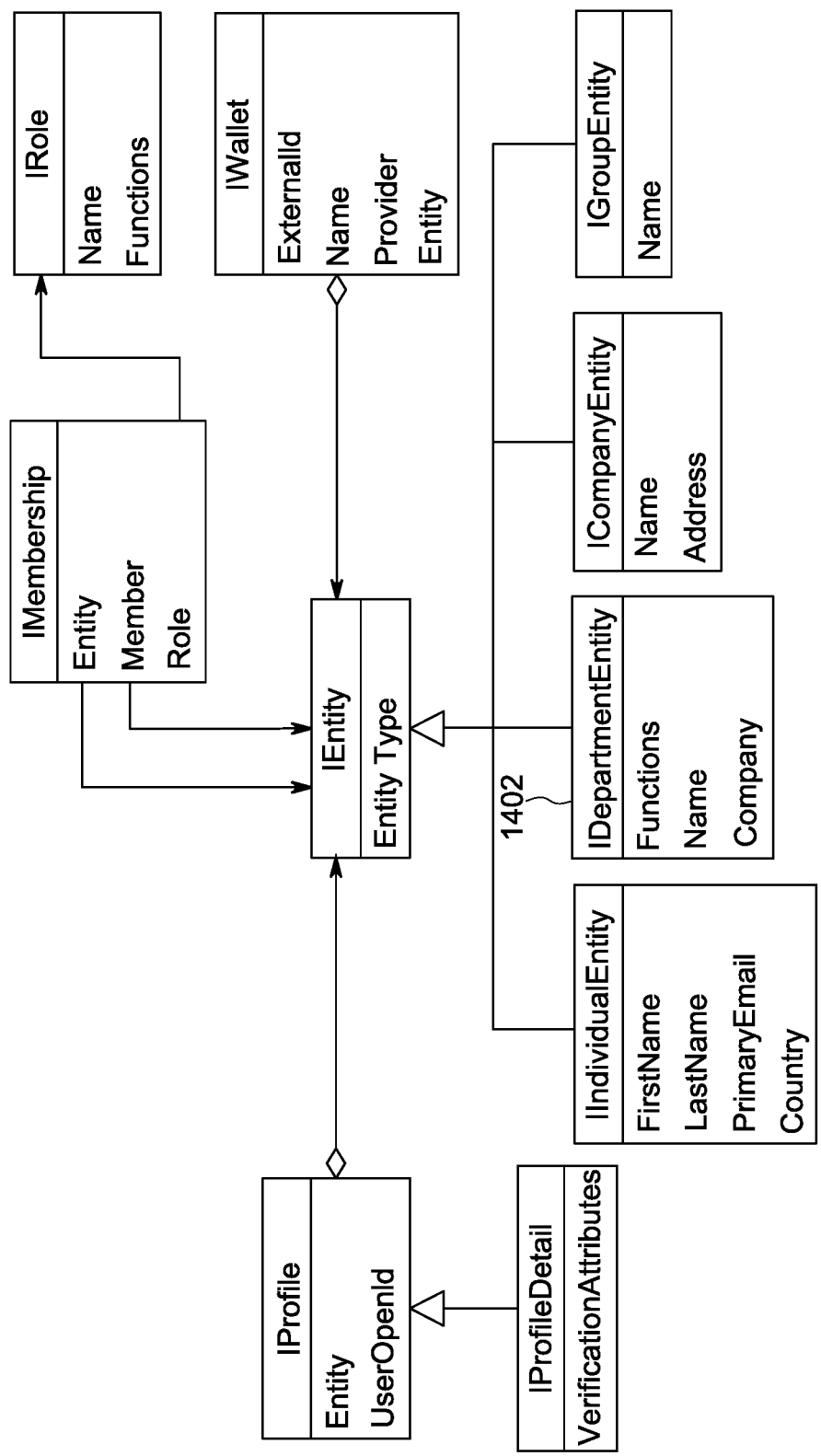
FIG. 14 illustrates object relationship data models in accordance with disclosed implementations.

Object relationship data models for assessing an individual's authority to act on behalf of an entity are illustrated in FIG. 14. At 1402, for example, the linkage between an IDepartmentEntity (Name: Google Finance Department) and an IIndividualEntity (FirstName: Dan, LastName: Doney) can be linked via a membership associating a role (Name: Comptroller) with the membership. Based on this membership and role, the linked entity can be authorized to perform specific Functions (Name: SendMoney) as a result of this linkage. When a transaction is authorized using this linkage, accountability can be through a membership identifier & provenance of authority can be traced through the data model linkages. Multilevel identifiers can be used if authority is nested through hierarchical membership.

To create the data model of FIG. 14, the following steps can be accomplished:

Off chain
Functions are assigned to an Entity via an approval process;
A Verification Agent has the ability to attest to an entity's qualification to perform a function;
Entities (Individual, Group, NPE) are assigned to parent entity via a membership service;
Authorities (right to perform a function) are delegated from parent entity to child entity via this linkage;
When an entity presents credentials demonstrating membership, they receive a token containing a key fragment and a membership identifier used for accountability. The token may also contain a role which can be used to further restrict access to certain group functions. The entity does not have direct access to fragment, identifier, or role;
Group authority is expressed as a public/private key pair. The transaction may be approved (signed) using multisig, MPC methods, or assembly of key fragment to decrypt the private key as disclosed above;
The group authority can be exercised by presenting the token containing the fragment which in turn is used to decrypt the private key and enable the action.

On chain:
Functions are assigned to an Entity via an approval process;
Verification Agent has the ability to attest to an entity's qualification to perform a function;
An entity token is deployed representing the authority to perform one or more functions on behalf of the entity (group);
Entities (Individual, Group, NPE) are assigned to the parent entity via a membership registry;
Authorities (right to perform a function) are delegated from parent entity to child entity via this linkage;

Member entities may exercise group authority by presenting individual credentials to the group by signing IAuthorize or IAttest data structures via the Entity Registry smart contract (see element 1202 of FIG. 12).

Figure 15A:
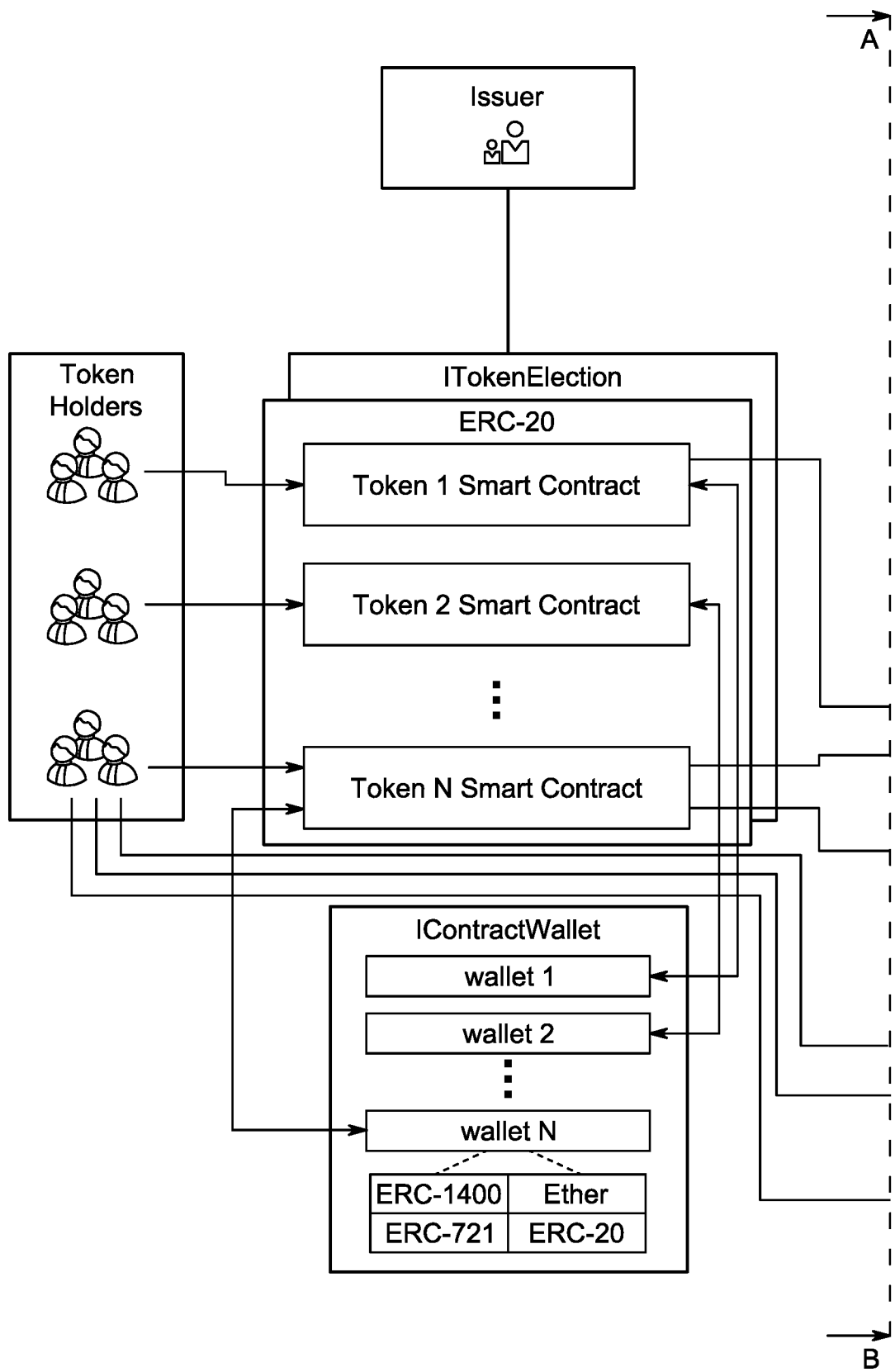
FIG. 15a illustrates an architecture in which authorization is accomplished through consensus in accordance with disclosed implementations.

Additionally, disclosed implementations can utilize a Consensus Authorization Model in the cryptographically linked authentication and authorization pattern described as the base pattern of the disclosure. Consensus wallets follow the same separation pattern as group wallets, that is, an initiator proposes a transaction by authenticating (signing an initiation transaction), an independent authorization process is engaged (in this case a consensus or voting model), and if authorized executes the transaction via a contract wallet. While implementation is possible using non-fungible tokens (e.g., ERC-721), a more common implementation is associated with fungible tokens, such as ERC-20 tokens, where the authorizers are the token holders casting authorizing votes. ERC-20 tokens are designed to have many owners and ownership is reflected, among other things, based on the percentage of shares owned by a particular wallet. FIG. 15 illustrates an architecture in which authorization is accomplished through consensus. The architecture of FIG. 15*a* includes ElectionRegistry 1502 database and VoteRegistry 1504 database.

As noted above, the token smart contract is assigned a Smart Contract wallet. The token issuer, or other authorized party, may propose a transaction. This party then initiates an election using a Consensus smart contract. Elections may use custom smart contracts to tally votes if special vote weighting or quorum techniques are desired. Token holders then cast votes by signing a transaction via wallet. Votes are tallied usually proportional to share ownership and voting rights. If the election passes, the proposed transaction authorized and executed using an IContractWallet.

Corporate governance often involves voting of certain classes of shareholders (token holders). In this case, a non-fungible token may be used representing the asset or entity, and linking one or more fungible tokens, each representing a share class. The non-fungible entity token controls the logic regarding the significance of each share class vote. Elections on topics are conducted to decide whether a corporate entity should perform a certain action. Votes are cast (usually proportional to share ownership though other governance models are possible) by eligible shareholders and results are tallied. If necessary conditions are met based on corporate by-laws, the entity may take the action.

Blockchain and other decentralized technologies offer an opportunity to accelerate and extend this process. A variation on the corporate wallets model shown previously is a consensus wallet where the members hold elections to exercise an authority. Another variation would be an election to exercise corporate authority based on share ownership by token holders of a particular class.

Since the election and vote collection smart contract are separate, a token smart contract that represents the entity could incorporate a consensus smart contract to perform certain transactions, allow an upgrade of contract logic, or exercise other authority on behalf of the corporate entity it represents using established proxy techniques. The case of an entity represented by a smart contract having a consensus process to allow constituents (token holders) to vote on whether to upgrade its smart contract is a particularly novel and consequential implementation of the pattern.

Figure 15B:
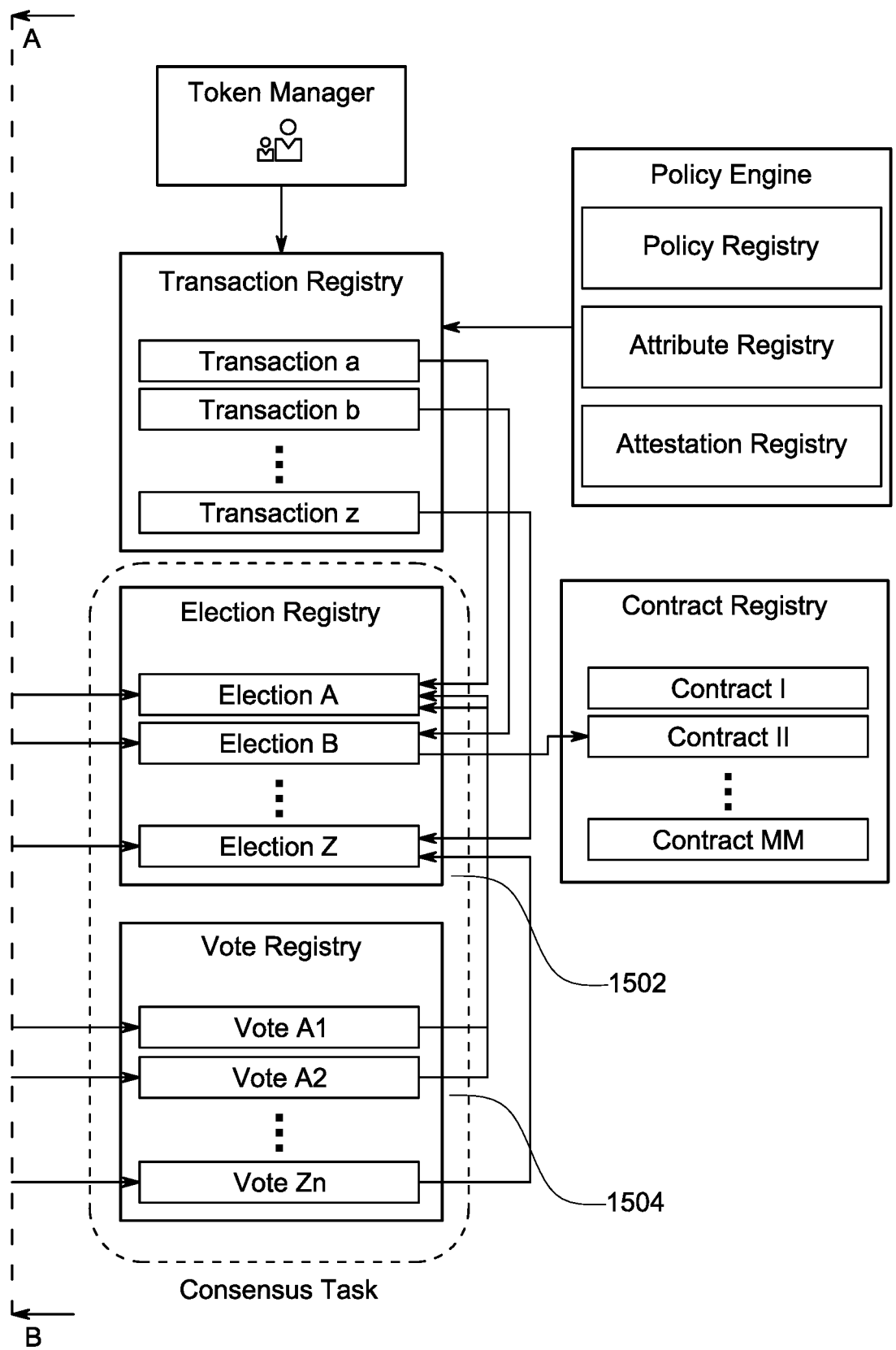
FIG. 15b is a continuation of FIG. 15a, which illustrates an architecture in which authorization is accomplished through consensus in accordance with disclosed implementations.
Figure 15C:
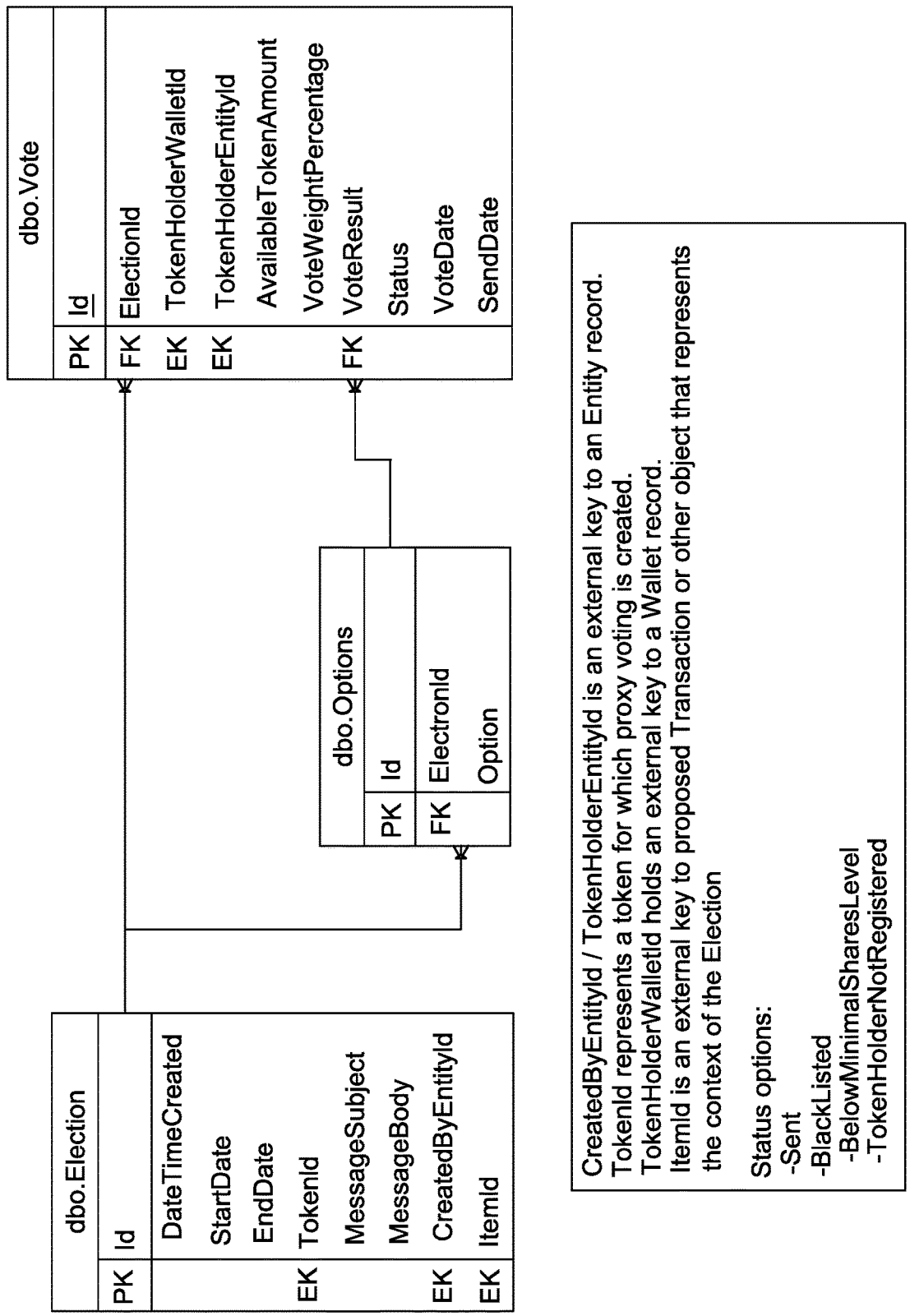

FIG. 15*b* is a data schema diagram providing more detail on data structures for the ElectionRegistry and VotingRegistry. The ElectionRegistry stores details on a proposed election to authorize a transaction. The proposed transaction is identified by an external key in the Item Id field. Eligible voters in the election are determined by the token (external key tokenId) and its distribution or other models designated by the token (for example, corporate members as defined by the membership function disclosed in a different implementation).

Other details about the election are also shown including start and end dates and voter instructions. Not shown include other options such as consensus model (ex majority, plurality, share weighted consensus, etc) or quorum requirements. Options available to a voter for a particular election are presented in the Options table. Default options for transaction approval are Approve and Disapprove. The VotingRegistry contains the results of the Election as eligible voters cast their vote by calling a Voting API or signing a Vote transaction using an eligible wallet. Once a quorum is reached, the ElectionRegistry will approve or deny the proposed transaction based on the election outcome.

Furthermore, decentralized workflow authorization can be injected into the base pattern of the disclosure, that is separated, but cryptographically linked authentication and authorization in the context of a transaction. Decentralized workflow authorization follows the same separation pattern as consensus wallets, that is, an initiator, or delegated non-person entity via a trigger, proposes a transaction by authenticating (signing an initiation transaction), an independent authorization process is engaged (in this case, a workflow process), and if authorized, the transaction is executed via a contract wallet. Some processes may not use a proposed transaction or contract wallet, but rather perform an authorization process as part of a larger transaction context.

A Workitem smart contract is used to produces tokens that represent state as proposed authorizations move through configurable corporate processes. Often, the performance of a function (or receipt of authority to conduct actions) comes through processes which involve a sequence of tasks or approvals involving multiple entities in a sequence. These sequences are known as "workflows." "Workitems" are data elements which contain state information to follow the workflow sequence to completion. Workflows consist of one or more tasks and routes that connect the tasks allowing different sequences based on the Workitem and task outcomes.

Disclosed implementations include the above-described novel techniques, architectures and data structures that permit the decentralization of workflow management. The technique uses smart contracts to perform workflow state management and store and execute processes (workflows). The benefits of decentralization of the storage and execution of business processes is analogous to the benefits of the decentralization of payments. For example, decentralization enables disintermediation allowing coordination between parties to complete processes across organizational boundaries and without dependencies on corporate systems.

Figure 16:
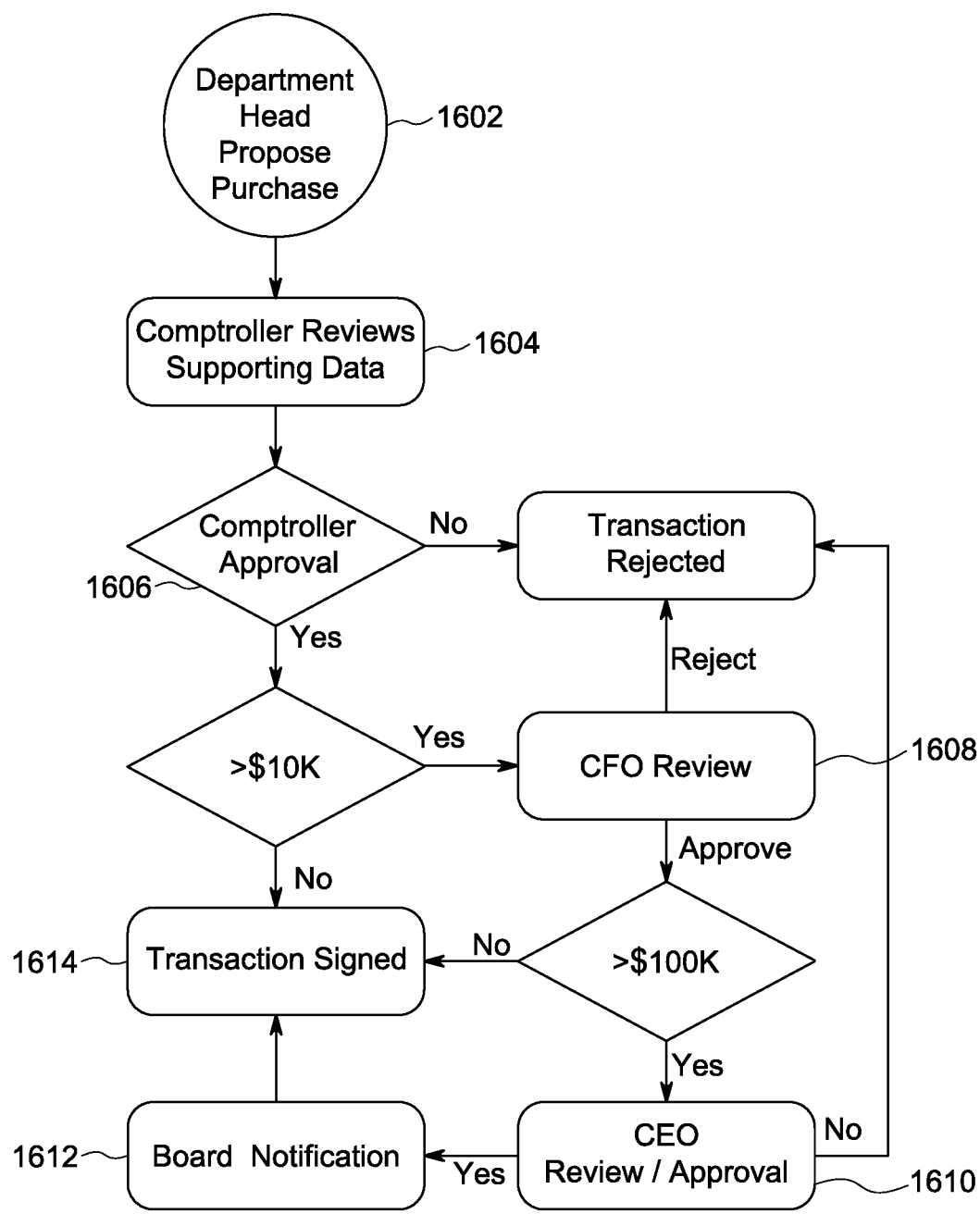
FIG. 16 is a flowchart of an example business process that can be managed using disclosed implementations.

FIG. 16 is a flowchart of a workflow diagram capturing an example of a corporate process in accordance with disclosed implementations. The Workflow includes one or more Tasks, each task having a Type, and Routes used to connect the Tasks. For example, task types can include: boundary tasks (e.g., start and stop), manual tasks (e.g., approvals), decision tasks (e.g., automated state changes based on workitem attributes); and routes (connectors between tasks).

Workflow can be captured and represented as map stored on a distributed ledger and executed via a decentralized Workflow Engine that includes smart contracts executed on a distributed ledger. Each workitem progresses through the flow. As an item enters a task, an event can be published to the transaction signing service and the affected, and/or other stakeholders, can be notified. These entities can select a route (state change) for the workitem, signing with their wallet to result in a state change moving to the next task based on the disposition. For example, the route selection can be approved or denied by the entity or entities. Because the workflows are decentralized, the workflows do not need to depend on centralized systems and can be executed from any wallet.

Each workitem can correspond to a non-fungible (e.g., ERC-721) token, that is a record of state in a Workitem Registry smart contract. Each token represents the current state of the process for a particular item or responsibility progressing through the workflow. Tasks are specific states within a workflow stored in the TaskRegistry. Manual tasks (those performed by humans) are performed by humans and signed by the responsible party using wallet key pairs. Automated tasks (decision points or other automated processing) can be executed via configurable smart contracts. Tasks are connected by Routes that represent state changes. A Workflow is the combination of tasks and routes for a process designed and monitored by flow administrators.

As shown in FIG. 16, an actor (department head) proposes a purchase, such as the purchase of manufacturing equipment, at 1602. The purchase is represented by a proposed ledger transaction. At 1604, another actor (comptroller) reviews supporting data, such as pricing, delivery, existing inventory of similar equipment, or any other relevant data, at 1604. At 1606, the comptroller can approve the ledger transaction, and thus the proposed purchase by signing the ledger transaction based on authority to act determined in the manner described above. If the purchase price greater than $10 k (US), in this example, the CFO is notified and provided opportunity to review and sign an approval transaction for the purchase at 1608. In this example, if the purchase price is greater than $100 k (US) a CEO approval is required at 1610. Once all approvals are obtained, the board is notified at 1612 and the Workflow is completed successfully resulting in the execution of the proposed transaction, at 1624, to allow the purchase of equipment to be conducted. All tasks are tracked on the distributed ledger and the various signatures can be obtained based on authorities to act as described herein. Each state of each workitem can be tracked based on the corresponding token as tracked in the Workitem Registry.

Figure 17A:
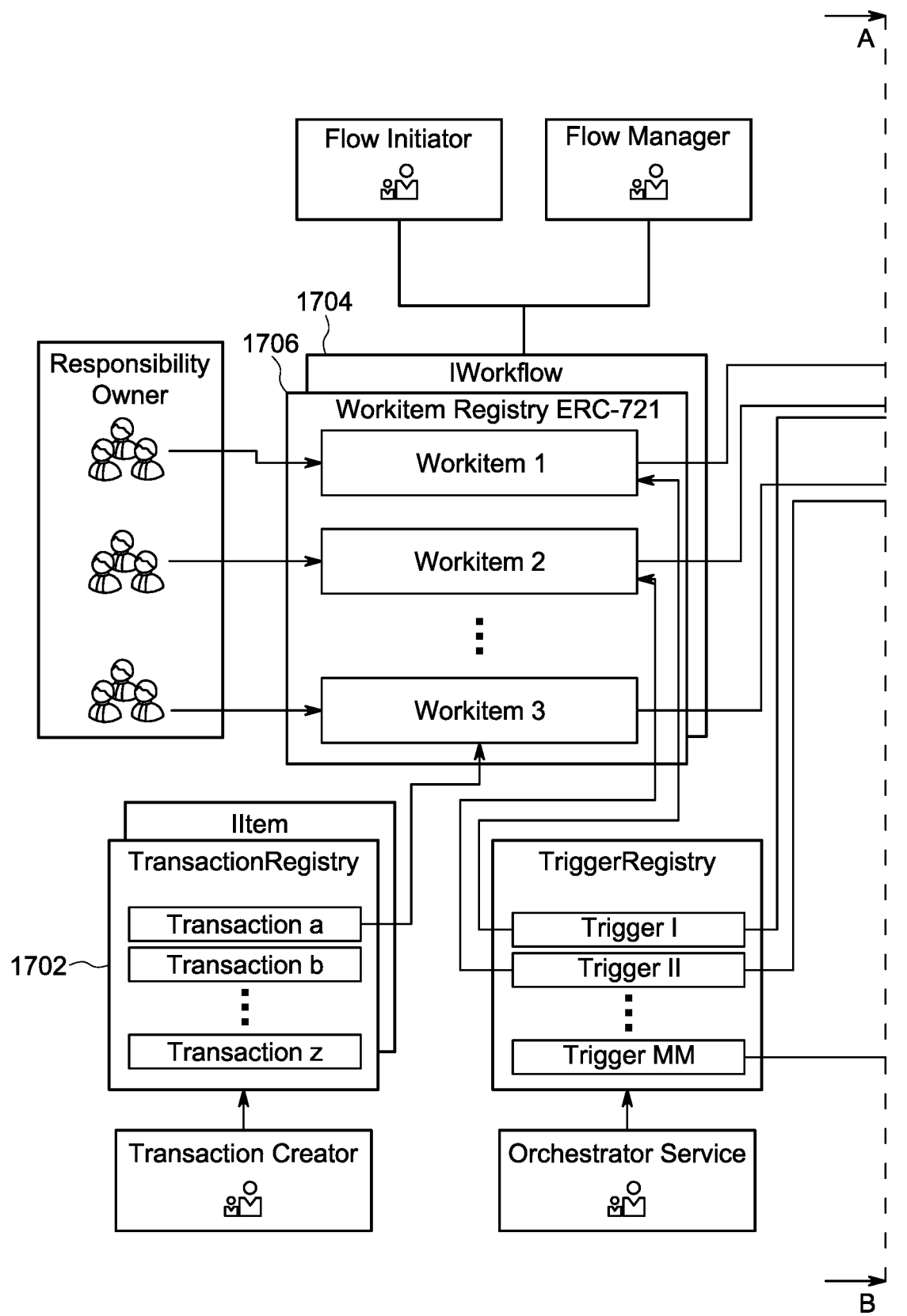
FIG. 17a illustrates an architecture of a decentralized workflow system in accordance with disclosed embodiments.
Figure 17B:
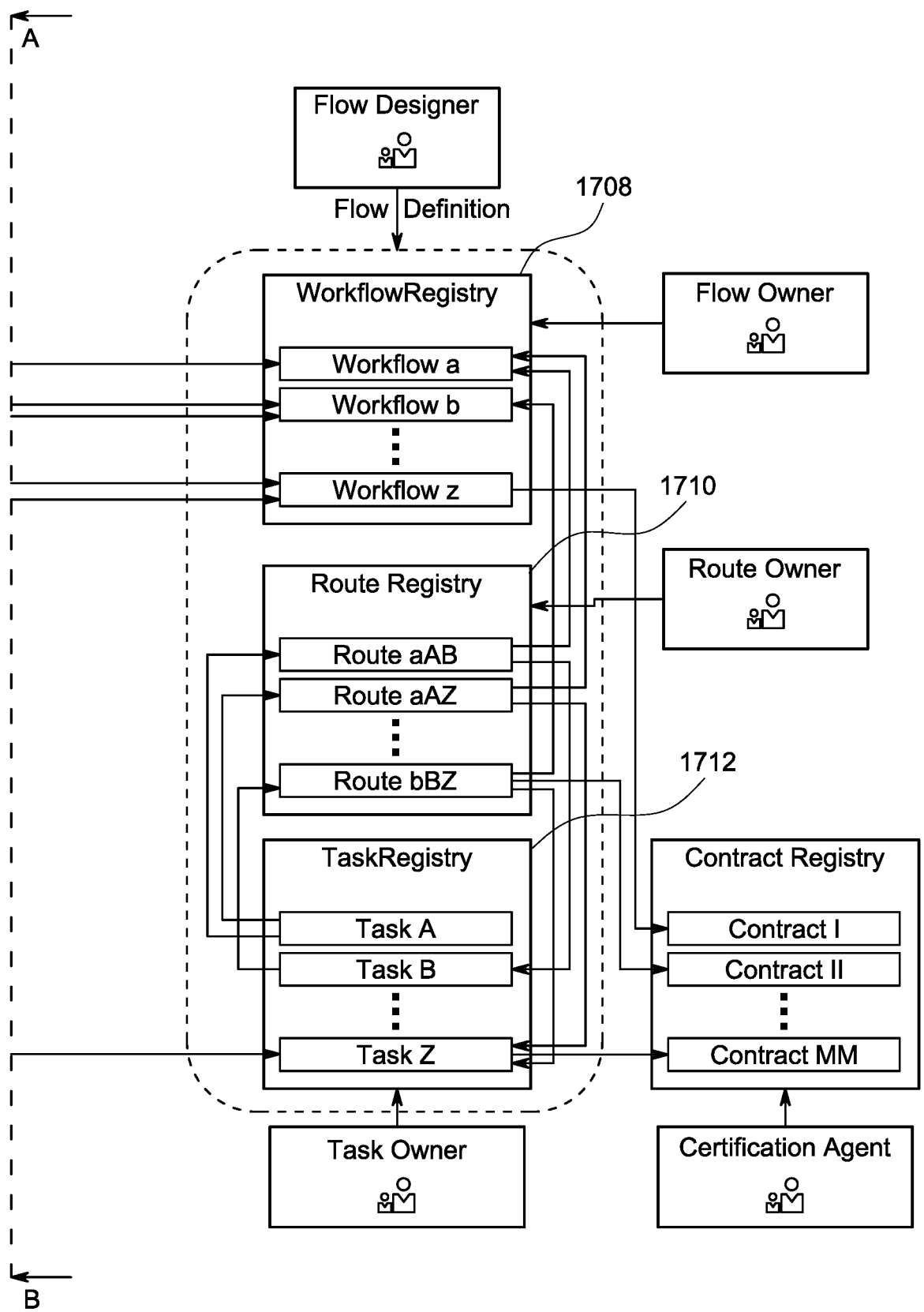
FIG. 17b is a continuation of FIG. 17a, which illustrates an architecture of a decentralized workflow system in accordance with disclosed embodiments.

FIG. 17 illustrates an architecture of a decentralized workflow system in accordance with disclosed embodiments. Ledger transactions are proposed via the TransactionRegistry 1702 and routed for approval via the Workflow Engine 1704 by creating a Workitem in the Workitem Registry referencing the proposed transaction (in the Item field), the designated Workflow, the current Task, and TaskState along with other metadata regarding the datetime of the initiation of the flow, last state change, and other data. The Workitem Registry 1706 is a smart contract that controls flow processing and maintains the current status of an item in the workflow via a workitem token (described above). WorkflowRegistry 1708 stores the various workflow definitions. A Workflow is a collection of zero to many Routes stored in RouteRegistry 1710, that link Task in the TaskRegistry. Tasks are descriptions of approvals, smart contracts execution instructions, or decisions that result in a change of state of the Workitem. On completion of a Task, the Workitem Registry implements the Workflow by routing the execution to the next Task as defined by available routes to enable processing of proposed Items (transactions). Various users can administer or design workflows, tasks or routes. Automated tasks can execute smart contracts that are tested and deployed by certification agents.

The annotated code below is an example of code that describes a process.

```
/// <summary>
/// This interface is used to describe processes (task
combinations linked by routes).
/// </summary>
public interface IWorkflow: IItem
{
/// <summary>
/// ReferenceId should be used by all interfaces that have
objects that are frequently known by their external identifier.
/// </summary>
[CanBeNull]
string ReferenceId {get; }
/// <summary>
/// Or It's user-friendly name to display (displayName).
/// </summary>
string Name {get; }
/// <summary>
/// The name of the provider.
/// </summary>
[CanBeNull]
string Provider {get; }
ITask Initial {get; }
ITask Final {get; }
}
Task
/// <summary>
/// This interface is used to manage tasks
(actions performed in a process).
/// </summary>
public interface ITask: IItem
{
/// <summary>
/// ReferenceId should be used by all interfaces that have
objects that are frequently known by their external identifier.
/// </summary>
[CanBeNull]
string ReferenceId {get; }
/// <summary>
/// Or It's user-friendly name to display (displayName).
/// </summary>
string Name {get; }
/// <summary>
/// The task type which defines the method of processing.
/// </summary>
TaskType TaskType {get; }
/// <summary>
/// Entity responsible for the execution of the task
(null means assignable by trigger or delegation)
/// Creating a task with an assigned entity requires
the signature of the entity
/// </summary>
[CanBeNull]
IEntity Entity {get; }
/// <summary>
/// The name of the provider.
/// </summary>
[CanBeNull]
string Provider {get; }
}
/// <summary>
/// This interface is used to describe routes (flow
controllers that link routes based on input).
/// </summary>
public interface IRoute: IItem
{
/// <summary>
/// ReferenceId should be used by all interfaces that have
objects that are frequently known by their external identifier.
/// </summary>
[CanBeNull]
string ReferenceId {get; }
/// <summary>
/// Or It's user-friendly name to display (displayName).
/// </summary>
```

```
string Name {get; }
/// <summary>
/// The process in which the route is tied to
/// </summary>
IWorkflow Workflow {get; }
/// <summary>
/// The task to initiate if the route is traversed
/// </summary>
ITask Task {get; }
/// <summary>
/// The task that is completed to traverse route
/// </summary>
ITask Source {get; }
/// <summary>
/// Used to define if a route is the default outbound path for a task
/// </summary>
bool IsDefault {get; }
/// <summary>
/// The name of the provider.
/// </summary>
[CanBeNull]
string Provider {get; }
}
Workitem
/// <summary>
/// This interface is used to describe workitems. Workitems
are used to track state in a task and or process.
/// </summary>
public interface IWorkitem : IItem
{
/// <summary>
/// ReferenceId should be used by all interfaces that have objects
that are frequently known by their external identifier.
/// </summary>
[CanBeNull]
string ReferenceId {get; }
/// <summary>
/// Or It's user-friendly name to display (displayName).
/// </summary>
string Name {get; }
/// <summary>
/// Defines the state of the task being executed.
/// </summary>
TaskState State {get; }
/// <summary>
/// The task being executed.
/// </summary>
ITask Task {get; }
/// <summary>
/// Entity responsible for the execution of the current task
(null when all tasks are completed)
/// </summary>
[CanBeNull]
IEntity Entity {get; }
/// <summary>
/// The process in which the task falls.
/// Can be null for workitems that are being executed
outside a process (ad hoc).
/// </summary>
[CanBeNull]
IWorkflow Workflow {get; }
/// <summary>
/// The item being processed by the task or flow.
/// Can be null for tasks that do not have an object
that is being processed.
/// </summary>
[CanBeNull]
IItem Item {get; }
/// <summary>
/// The workitem that resulte in the generation of a child workitem.
/// Used for workflows which have embedded workflows
and for parallel tasks.
/// Can be null for workitem that are not derived from other workitems.
/// </summary>
[CanBeNull]
IWorkitem Parent {get; }
/// <summary>
/// The name of the workflow provider.
/// </summary>
[CanBeNull]
string Provider {get; }
}
/// <summary>
/// This interface is used to represent triggers (time or
event based signals that cause a task to be executed).
/// </summary>
public interface ITrigger: IItem
{
/// <summary>
/// ReferenceId should be used by all interfaces that have
objects that are frequently known by their external identifier.
/// </summary>
[CanBeNull]
string ReferenceId {get; }
/// <summary>
/// Or It's user-friendly name to display (displayName).
/// </summary>
string Name {get; }
/// <summary>
/// The type of Trigger
/// </summary>
TriggerType TriggerType {get; }
/// <summary>
/// The status of the Trigger (enabled/disabled)
/// </summary>
TriggerStatus Status {get; }
/// <summary>
/// The item associated with the trigger
/// </summary>
IItem Item {get; }
/// <summary>
/// The task to be executed if the trigger is fired
/// </summary>
ITask Task {get; }
/// <summary>
/// The task to be executed if the trigger is fired
/// </summary>
[CanBeNull]
IWorkflow Workflow {get; }
/// <summary>
/// The name of the provider.
/// </summary>
[CanBeNull]
string Provider {get; }
/// <summary>
/// The number of times the Trigger has been fired.
/// </summary>
int Counter {get; }
/// <summary>
/// Used to store additional data
/// </summary>
[CanBeNull]
string OtherData {get; }
}
```

The disclosed implementations can be implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Additional alternative structural and functional designs may be implemented for cryptographically linked, but procedurally separated, authentication and authorization in the context of a signing transaction. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method for executing a data transaction on a decentralized computer network on behalf of an entity wherein an actor's right to conduct the transaction on behalf of the entity is determined by an actor authentication process which is cryptographically linked to, but separate from, an entity authorization process, the method comprising:
    authenticating the actor;
    in response to authenticating the actor, creating a cryptographically signed data packet providing an actor ID, optionally an entity ID to represent the scope of the authentication, and an authenticating service ID to thereby establish an authentication context for the transaction;
    verifying the authentication context;
    formulating the proposed data transaction in the context of the entity;
    authorizing the transaction by validating an authority of the actor to perform the proposed transaction on behalf of the entity;
    wherein the authority of the actor is validated through split key encryption;
    executing the data transaction on behalf of the entity including signing the data transaction to provide cryptographic assurance of the completion of the authenticating step, the creating step, the verifying step, the defining step and the authorizing step; and
    recording the signed data transaction on a decentralized ledger of the decentralized computer network.

2. The method of claim 1, wherein the actor is an individual person or a group of persons.

3. The method of claim 1, wherein the data transaction represents a financial transaction.

4. The method of claim 1, wherein the cryptographically signed data packet includes a time-based expiration.

5. The method of claim 4, wherein the authenticating and authorizing processes are linked off-chain using shared secret asymmetric encryption of the cryptographically signed data packet.

6. The method of claim 4, wherein the authenticating includes at least one of Lightweight Directory Access Protocol (LDAP) authentication, ActiveDirectory authentication, biometric authentication, and password authentication resulting in the issuing of a cryptographically signed data packet.

7. The method of claim 1, wherein the authenticating the actor includes the actor causing the proposed transaction to be signed with a signature derived from a cryptographic wallet associated with the actor in the cryptographic context for the transaction.

8. The method of claim 1, wherein signing the data transaction includes at least one of split key encryption, fragments used to encrypt a private key, a multi-signature method associated with external processes, a multi party computation method associated with an external process, and/or signing by an on-chain wallet transaction that is processed to determine authorization.

9. The method of claim 1, wherein the authorizing is based on an entity organizational structure and roles.

10. The method of claim 9, wherein the entity organization structure includes a plurality of levels and level identifiers are used to provide authority through the entity structure.

11. The method of claim 1, wherein the authorizing is based on group voting.

12. The method of claim 1, wherein the authorizing is based on workflow automation.

13. The method of claim 1, wherein at least one wallet is encapsulated by a smart contract to thereby represent group authority of at least one group and wherein the at least one wallet is used to execute transactions on behalf of the at least one group.

14. The method of claim 1, wherein at least one workflow is represented as map stored on the decentralized ledger and executed via a decentralized workflow engine that includes smart contracts executed on the decentralized ledger, the workflow including workitems, routes, and tasks, and each of the workitems has a corresponding nonfungible token on the decentralized ledger, whereby the task approver can select a route for the workitem, within the workflow.

15. A system for executing a data transaction on a decentralized computer network on behalf of an entity wherein an actor's right to conduct the transaction on behalf of the entity is determined by an actor authentication process which is cryptographically linked to, but separate from, an entity authorization process, the system comprising:
at least one computer processor; and
at least one memory device operatively coupled to the at least one computer processor and storing instructions thereon which, when executed by the at least one computer processor, cause the at least one computer processor to be operable to:
authenticate the actor;
in response to authenticating the actor, create a cryptographically signed data packet providing an actor ID, an entity ID, an authenticating service ID to thereby establish a cryptographic context for the transaction;
verify the cryptographic context;
formulate the proposed data transaction in the context of the entity;
authorize the transaction by validating an authority of the actor to perform the proposed transaction on behalf of the entity;
wherein the authority of the actor is validated through split key encryption;
execute the data transaction on behalf of the entity including signing the data transaction to provide cryptographic assurance of the completion of the actor being authenticated, the cryptographically signed data packet being created, the cryptographic context being verified, the cryptographic context being defined, and the transaction being authorized;
and
record the signed data transaction on a decentralized ledger of the decentralized computer network.

16. The system of claim 15, wherein the actor is an individual person or a group of persons.

17. The system of claim 15 wherein the data transaction represents a financial transaction.

18. The system of claim 15, wherein the cryptographically signed data packet includes a time-based expiration.

19. The system of claim 18, wherein the authenticating and authorizing processes are linked off-chain using shared secret asymmetric encryption of the cryptographically signed data packet.

20. The system of claim 15, wherein the authenticating includes at least one of Lightweight Directory Access Protocol (LDAP) authentication, ActiveDirectory authentication, biometric authentication, and password authentication resulting in the issuing of the cryptographically signed data packet.

21. The system of claim 15, wherein the authenticating the actor includes the actor causing the proposed transaction to be signed with a signature derived from a cryptographic wallet associated with the actor in the cryptographic context for the transaction.

22. The system of claim 15, wherein signing the data transaction includes at least one of split key encryption, fragments used to encrypt a private key, a multi-signature method associated with external processes, a multi-party computation method associated with an external process, and/or signing by an on-chain wallet transaction that is processed to determine authorization.

23. The system of claim 15, wherein the authorizing is based on an entity organizational structure and roles.

24. The system of claim 23, wherein the entity organization structure includes a plurality of levels and level identifiers are used to provide authority through the entity structure.

25. The system of claim 15, wherein the authorizing is based on group voting.

26. The system of claim 15, wherein the authorizing is based on workflow automation.

27. The system of claim 15, wherein at least one wallet is encapsulated by a smart contract to thereby represent group authority of at least one group and wherein the at least one wallet is used to execute transactions on behalf of the at least one group.

28. The system of claim 15, wherein at least one workflow is represented as map stored on the decentralized ledger and executed via a decentralized workflow engine that includes smart contracts executed on the decentralized ledger, the workflow including workitems, routes, and tasks, and each of the workitems has a corresponding nonfungible token on the decentralized ledger, whereby the task approver can select a route for the workitem, within the workflow.

* * * * *